United States Patent
Zhang et al.

(10) Patent No.: US 12,320,941 B2
(45) Date of Patent: Jun. 3, 2025

(54) METHODS AND APPARATUSES FOR SEISMIC CHARACTERIZATION OF SUBSURFACE FORMATIONS

(71) Applicant: CHINA PETROLEUM & CHEMICAL CORPORATION, Beijing (CN)

(72) Inventors: Changhua Zhang, Houston, TX (US); Mingqiu Luo, Houston, TX (US); Min Zhou, Houston, TX (US); Bin Yu, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 310 days.

(21) Appl. No.: 18/150,174

(22) Filed: Jan. 4, 2023

(65) Prior Publication Data
US 2024/0219599 A1    Jul. 4, 2024

(51) Int. Cl.
*G01V 1/50* (2006.01)
*G01V 1/46* (2006.01)

(52) U.S. Cl.
CPC . *G01V 1/50* (2013.01); *G01V 1/46* (2013.01)

(58) Field of Classification Search
None
See application file for complete search history.

(56) References Cited

U.S. PATENT DOCUMENTS

| | | | | |
|---|---|---|---|---|
| 10,324,212 B2* | 6/2019 | Padhi | | G01V 1/42 |
| 10,436,927 B2* | 10/2019 | Sun | | G01V 1/364 |
| 11,255,994 B2* | 2/2022 | Ito | | E21B 17/025 |
| 11,360,233 B2* | 6/2022 | Ramfjord | | E21B 7/04 |
| 11,644,589 B2* | 5/2023 | Le Guern | | G01V 1/282 |
| | | | | 702/16 |
| 11,808,903 B2* | 11/2023 | Beam | | G06F 9/5027 |
| 11,815,651 B2* | 11/2023 | Mishchenko | | G06T 17/20 |
| 12,130,400 B2* | 10/2024 | Mishchenko | | G06T 19/20 |
| 2004/0122594 A1* | 6/2004 | Matsuoka | | G01V 1/48 |
| | | | | 702/11 |
| 2005/0075789 A1* | 4/2005 | Xiao | | G01V 11/00 |
| | | | | 702/6 |
| 2015/0142320 A1* | 5/2015 | Wu | | G01V 3/38 |
| | | | | 702/11 |

(Continued)

*Primary Examiner* — Isam A Alsomiri
*Assistant Examiner* — Jonathan D Armstrong
(74) *Attorney, Agent, or Firm* — NKL Law; Allen Xue

(57) ABSTRACT

Method and apparatus for performing a seismic full waveform inversion independent of a source wavelet to generate a final velocity model of subsurface formations of a survey region are provided. The method includes positioning seismic data recording sensors in the survey region; blasting at points of incidence in the survey region to generate seismic waves; and sensing and recording the seismic waves using the seismic data recording sensor. The recorded seismic waves are seismic data. The method further includes transmitting the seismic data to a computer system including one or more memories and storing the seismic data in one or more memories; storing a source wavelet in the one or more memories; performing, by the computer system, a forward modeling operation using the source wavelet; and generating, by the computer system, the final velocity model for the seismic full waveform inversion using the forward modeling operation.

16 Claims, 14 Drawing Sheets

(56) References Cited

U.S. PATENT DOCUMENTS

| | | | |
|---|---|---|---|
| 2018/0058211 A1* | 3/2018 | Liang | E21B 44/00 |
| 2018/0100950 A1* | 4/2018 | Yao | E21B 47/085 |
| 2018/0120464 A1* | 5/2018 | Sun | G01V 1/282 |
| 2019/0049612 A1* | 2/2019 | Padhi | G01V 1/42 |
| 2019/0265373 A1* | 8/2019 | Ito | G01V 20/00 |
| 2020/0033494 A1* | 1/2020 | Patterson | E21B 49/00 |
| 2020/0158898 A1* | 5/2020 | Le Guern | G01V 1/345 |
| 2020/0301036 A1* | 9/2020 | Ramfjord | E21B 7/04 |
| 2021/0018639 A1 | 1/2021 | Sun et al. | |
| 2021/0239869 A1* | 8/2021 | Beam | G06F 9/5061 |
| 2021/0246777 A1* | 8/2021 | Zhao | E21B 47/005 |
| 2021/0311215 A1* | 10/2021 | Liu | E21B 49/00 |
| 2021/0405236 A1 | 12/2021 | Wang | |
| 2022/0099855 A1* | 3/2022 | Li | G01V 1/345 |
| 2022/0187496 A1* | 6/2022 | Mishchenko | G06T 19/20 |
| 2023/0041525 A1* | 2/2023 | Hong | G01V 3/38 |
| 2024/0061145 A1* | 2/2024 | Mishchenko | G06T 17/005 |
| 2024/0337768 A1* | 10/2024 | Mizuno | G01V 1/50 |

* cited by examiner

METHODS AND APPARATUSES FOR SEISMIC CHARACTERIZATION OF SUBSURFACE FORMATIONS

TECHNICAL FIELD

The present disclosure relates to seismic survey methods and apparatus for constructing high resolution geological models by performing an improved seismic full waveform inversion to enhance characterization of complex subsurface structures in a survey region.

BACKGROUND

It is well known that imaging complex subsurface structures from the surface recorded seismic data analyses plays an important role in the lithology identification and fluid discrimination in seismic exploration and reservoir characterization. Several seismic imaging methodologies (techniques or approaches) have been employed in the industry, which belong to two categories—migration and inversion. The migration methodologies obtain the reflectivity map (image) of the subsurface structure. The first such method is the weighted stack method from pre-stack seismic data, introduced by Smith and Gidlow (Smith G. C. and P. M. Gidlow, 1987, Weighted stacking for rock property estimation and detection of gas, Geophysical Prospecting, 35, 993-1014). The disadvantage of this method is that the image is not a true map of reflectivity, and the location of reflectors are not in their true location either in time or depth domain. For media with smooth lateral variation, this disadvantage can be overcome by the Kirchhoff migration method.

Around the 1980s, Reverse Time Migration (RTM) quickly became the high-end imaging method of choice in complex geology [(Baysal E., D. D. Kosloff, and J. W. C. Sherwood, 1983, Reverse time migration, Geophysics, 48, 1514-1524), and (Etgen, J., 1986, Prestack reverse time migration of shot profiles: SEP-Report, 50, 151-170)]. To obtain the high-resolution of such images using migration methods, (1) high density and multifold acquisition systems have been designed, and (2) medium macromodels or background models at least with the correct kinematic information are also required in the migration methods. Building such accurate macromodels for relatively simple geologic targets, such as shallow-water environments, is relatively simple, but becomes challenging in complex geologic environments, such as salt domes, sub-basalt targets, thrust belts, and land foothills. This model building procedure is the second type of imaging which may include: methods obtaining rock density and/or the pressure propagating speed in the rock, such as refraction tomography as in the example of Osypov (Osypov K., 2001, Refraction Tomography: A Practical Overview of Emerging Technologies, CSEG Recorder 26, 2001); seismic travel-time tomography as in the example of Bording (Bording R. P., A. Gersztenkorn, L. R. Lines, J. A. Scales, and S. Treitel, 1987, Applications of seismic travel-time tomography, Geophysical Journal International 90, 285-303); and full waveform inversion as in the examples of Lailly (Lailly P., 1983, The seismic inverse problem as a sequence of before stack migrations: Conference on Inverse Scattering, Theory and Application, Society for Industrial and Applied Mathematics, Expanded Abstracts, 206-220) and Tarantola (Tarantola A., 1984, Inversion of seismic reflection data in the acoustic approximation, Geophysics, 49, 1259-1266). The models built from these tomographic or full wave inversion (FWI) methods can be used in migrations and can significantly improve the image quality and resolution. While travel time tomography method(s) may invert smooth models with correct kinematic information that is sufficient for migration purposes, full waveform inversion (FWI) can obtain high-resolution pressure and shear wave traveling speed, anisotropy, and density models in the rock, which are crucial to geological interpretation.

$$f(m; x)w_s(x, t) = f_s(t), \qquad (1)$$

The actual seismic waves propagating under the subsurface of the earth are often too complex to model because of the complexities of the subsurface earth model. However, one can take different approximations to the subsurface earth model, such as elastic or acoustic in an isotropic or anisotropic medium, and with or without attenuation. The seismic data, which is recorded by seismic data recording sensors (recorders), is related to reflections and refractions of seismic waves under the surface of the earth in response to sources, which may be seismic equipment causing blasts or by other source generating equipment which generates seismic waves under the surface of the earth. Full waveform inversion involves a numerical simulation of the seismic waves propagating through updated earth models iteratively. Early in the full waveform inversion development, the seismic waves are assumed as purely acoustic because the acoustic wave equation is relatively simple and can be solved efficiently. As the computational power increases, elastic full waveform inversion becomes feasible and more attractive because elastic waves are much closer to characterize the true underground seismic waves than the acoustic counterparts. Regardless the kind of wave equations used, they all can be mathematically casted as:

$$f(m; x)w_s(x, t) = f_s(t), \qquad (1)$$

where m is the earth model vector, x is the spatial location, t is time, F(m; x) is the corresponding forward modelling operator, and $w_s(x, t)$ is the forward solution for a source wavelet $f_s(t)$ excited at a location s.

However, analytic solutions to the wave equation (1) exist only for simple models. For the vast majority of cases, a numerical method is needed. All the numerical methods consist of discretization of both spatial variables x and time variable t, such that the solution $w_s(x, t)$ is approximated as $w_s(x_i, t_j)$, where i=1, ..., N is the grid point with N total grid points, and j=1, ..., M is the time step with M total time steps. The commonly used numerical methods are finite difference method, finite element method, and spectral element method (Fichtner, A., 2011, Full Seismic Waveform Modelling and Inversion, Springer).

As indicated above, Reverse Time Migration (REM) is a seismic imaging method well-known in the art. RTM is primarily used to map the sub-surface reflectivity using recorded seismic waveforms. RTM is a three-step procedure of (a) forward-modelling a simulated wavefield through an appropriate velocity model, (b) reversely propagating the recorded seismic data through the very same model, and (c) super-positioning both using an imaging condition. In most cases RTM methods seek an initial image of the subsurface reflectivity as the best match in an image space between the extrapolation of time-reversed waveform data and the simulated prediction based on an estimated velocity model and source parameters. Therefore, the image quality of RTM methods can be used to benchmark the success or failure of an inverted model generated by a full waveform inversion (FWI), which is also referred to as an FWI model or inverted model.

Full waveform inversion (FWI) is further discussed in Tarantola (Tarantola A., 1984, Inversion of seismic reflection data in the acoustic approximation, Geophysics, 49, 1259-1266) and Virieux (J., A. Asnaashari, R. Brossier, L. Métivier, A. Ribodetti, and W. Zhou, 2014, An introduction to full waveform inversion, Geophysical References Series, R1-R40). Full waveform inversion (FWI) is a data-driven tool to automatically build subsurface medium parameters m, such as velocity, anisotropy parameter, and/or density models, by iteratively minimizing the difference between recorded data and modeled synthetic data. Given an initial guess of the subsurface parameters $m_0$, the velocity models, and anisotropy parameter models, as well as density model, the synthetic data are predicted by solving a forward seismic wave-equation (1) with a source wavelet $f_s(t)$. An adjoint equation of the forward wave-equation (1) is solved using the residual between the data and synthetic data as source to obtain the adjoint wave equation solutions. A gradient is obtained by cross-correlating the forward and adjoint wave equation solutions, then used to update the model along the direction to reduce the misfit between the observed and predicted data. These steps are repeated in an iterative fashion until the data-misfit is sufficiently small.

Mathematically, FWI can be formulated as an optimization problem:

$$\min_m C(m) = \sum_{s=1}^{N_s} \sum_{r=1}^{N_r} \int_0^T dt |d_{obs,s,r}(t) - d_{syn,s,r}(m; t)|^2, \quad (2)$$

where C(m) is a misfit function measuring the distance between the synthetic data and the recorded data, and the modulus operation is denoted by the symbol |·|. Inside the misfit function, $N_s$ is the number of sources ("s" standing for "source"), $N_r$ is the number of receivers for a given source ("r" standing for "receiver"), T is the maximum recording time starting from 0, $d_{obs,s,r}(t)$ is the recorded data at time t for a given source s at the receiver r, $d_{syn,s,r}(m; t)$ is the synthetic data at time t for the same source s and at the same receiver r, obtained by solving the forward seismic wave-equation (1), from which $d_{syn,s,r}(m; t)=P_{s,r}w_s(m; t)$, $P_{s,r}$ resampling the wave solution $w_s(t)$ to the receiver location r. The misfit function (2) is known, such as the least-squares misfit function.

Full waveform inversion (FWI) as an optimization problem is highly a nonlinear process, and its success in real field application depends on many factors, such as the choice of the wave equation to describe the subsurface wavefield, the initial models $m_0$ used in the wavefield simulation, and the source wavelet $f_s(t)$, just name a few. All these factors are unknown. Among them the unknown source wavelet is a critical issue in the FWI. A small error in this source wavelet may lead to large discrepancies in the inverted model, which accumulates as the depth increases.

In order to improve images of complex subsurface structures in a survey region, there is a need for a new technology that is not dependent on the accuracy of the source wavelet in wave equation (1), which is referred to as being independent of the source wavelet or being source wavelet independent in this disclosure. The new technology should also be applicable to both acoustic full waveform inversion and elastic full waveform inversion.

SUMMARY

One or more embodiments generate inverted model parameters, which are independent of source wavelet, and which are used to perform seismic full waveform inversion to generate high resolution geological models for high resolution imaging of a survey region including complex subsurface structures.

One or more embodiments are independent of the source wavelet in wave equation (1), and applicable to both acoustic full waveform inversion and elastic full waveform inversion.

One or more embodiments overcome the deficiencies of the unknown source wavelet in full waveform inversion (FWI) by providing a new approach to modify the misfit function in equation (2) above in a way that does not require estimating the source wavelet $f_s(t)$ in the forward seismic wave-equation (1) above. This approach generates the inverted model parameters that are independent of the choice of this wavelet. This method thus overcomes one of the major deficiencies of full waveform inversion (FWI) in order to build high resolution geological models to improve images of complex subsurface structures in a survey region to improve lithology identification, fluid discrimination, and reservoir characterization in the field of seismic explorations.

In an aspect, there is provided a method for performing a seismic full waveform inversion to generate a final velocity model of subsurface formations of a survey region. The method may include (a) positioning seismic data recording sensors in the survey region at different locations and/or positioning a well logging tool including seismic data recording sensors in a well bore in the survey region; (b) blasting at points of incidence in the survey region to generate seismic waves, which travel through subsurface earth formations; (c) sensing the seismic waves and recording seismic data based on the seismic waves using the seismic data recording sensors; (d) transmitting the seismic data from the seismic data recording sensors to a computer system including one or more memories and storing the seismic data in one or more memories; (e) storing a source wavelet in the one or more memories; (f) performing, by the computer system, a forward modeling operation using a source wavelet and a current velocity model; (g) generating, by the computer system, an updated velocity model for the seismic full waveform inversion using the forward modeling operation; (h) performing operations (f) and (g) until convergence; (i) outputting the updated velocity as the final velocity model to a display upon convergence; and (j) displaying a high resolution image of the final velocity model on the display of the computer system.

In an aspect, the seismic full waveform inversion may be one of an acoustic inversion and an elastic inversion, and wherein the subsurface formations of the survey region are isotropic or anisotropic.

In an aspect, one or more memories stores an initial velocity model.

In an aspect, the forward modeling operation may generate synthetic data and a forward wavefield.

In an aspect, the generating, by the computer system, the operation (g) may further include matching the seismic data with the synthetic data and evaluating the misfit between the seismic data and the synthetic data using a misfit function, wherein the misfit function includes $$\min_{m} C(m) = \sum_{s=1}^{N_s} \sum_{r=1}^{N_r} \int_0^T dt |d_{obs,s,r}(t) - d_{syn,s,r}(m;t)|^2,$$

where * denotes a convolution operator, m is an earth model vector, t is time, and $M_s(t)$ is a matching filter by matching the synthetic data to the seismic data with a least squared Wiener filter $$M_s(t) = \text{Inverse Fourier Transform} \left[ \frac{\sum_{r=1}^{N_r} d_{syn,s,r}^\dagger(\omega) d_{obs,s,r}(\omega)}{\sum_{r=1}^{N_r} d_{syn,s}^\dagger(\omega) d_{syn,s}(\omega) + \epsilon} \right],$$

where $d_{obs,s,r}(\omega)$ and $d_{syn,s,r}(\omega)$ are Fourier transform of the time domain observed and synthetic data.

In an aspect, the wherein the operation (g) may further include generating an adjoint source based on misfit between the seismic data and the synthetic data.

In an aspect, the adjoint source operation may be generated according to the following equation:

$$f_{adj,s}(t) = \sum_{r=1}^{N_r} M_s(t) \otimes [d_{obs,s,r}(t) - M_s(t) * d_{syn,s,r}(m;t)],$$

where ⊗ denotes the cross-correlation operator.

In an aspect, the operation (g) may further include determining an inversion gradient based on the adjoint source.

In an aspect, the operation (g) may further include determining a step length and a step direction for updating the velocity model; and updating the velocity model.

In an aspect, the source wavelet may be an Ormsby wavelet or a Ricker wavelet.

In an aspect, there is provided system for performing a seismic full waveform inversion to generate a velocity model of subsurface formations of a survey region. The system may include a plurality of seismic data recording sensors positioned in the survey region at different locations and/or a well logging tool including seismic data recording sensors positioned in a well bore in the survey region; a blasting device positioned at each point of incidence in the survey region to generate seismic waves, which travel through subsurface earth formations; and a plurality of seismic data recording sensors to sense seismic waves and record seismic data based on the seismic waves. The seismic data recording sensors may transmit the seismic data to a computer system including one or more memories and at least one processor, the one or more memories may store the transmitted seismic data, a source wavelet, and instructions, and the one or more processors may execute the instructions stored in the one or more memories to implement: (a) performing a forward modeling operation using a source wavelet; (b) generating an updated velocity model for the seismic full waveform inversion using the forward modeling operation; (c) performing operations (a) and (b); (d) outputting the updated velocity model as the final velocity model to a display upon convergence; and (e) displaying a high-resolution image of the final velocity model on the display of the computer system.

In an aspect, the operation (g) may further include matching the seismic data with the synthetic data and evaluating the misfit between the seismic data and the synthetic data using a misfit function, wherein the misfit function includes $$\min_{m} C(m) = \sum_{s=1}^{N_s} \sum_{r=1}^{N_r} \int_0^T dt |d_{obs,s,r}(t) - d_{syn,s,r}(m;t)|^2,$$

where * denotes a convolution operator, m is an earth model vector, t is time, and $M_s(t)$ is a matching filter by matching the synthetic data to the seismic data with a least squared Wiener filter $$f_{adj,s}(t) = \sum_{r=1}^{N_r} M_s(t) \otimes [d_{obs,s,r}(t) - M_s(t) * d_{syn,s,r}(m;t)],$$

where $d_{obs,s,r}(\omega)$ and $d_{syn,s,r}(\omega)$ are Fourier transform of the seismic data and synthetic data.

In an aspect, the operation (g) may further include generating an adjoint source based on the misfits between the seismic data and the synthetic data.

In an aspect, the adjoint source may be generated according to the following equation:

$$f_{adj,s}(t) = \sum_{r=1}^{N_r} M_s(t) \otimes [d_{obs,s,r}(t) - M_s(t) * d_{syn,s,r}(m;t)],$$

where ⊗ denotes the cross-correlation operator.

In an aspect, the operation (g) may further include determining an inversion gradient based on the adjoint source.

In an aspect, the operation (g) may further include determining a step length and a step direction for updating the velocity model; and updating the velocity model.

BRIEF DESCRIPTION OF THE DRAWINGS

The teachings of the present invention can be readily understood by considering the following detailed description in conjunction with the accompanying drawings.

DETAILED DESCRIPTION

Figure 1:
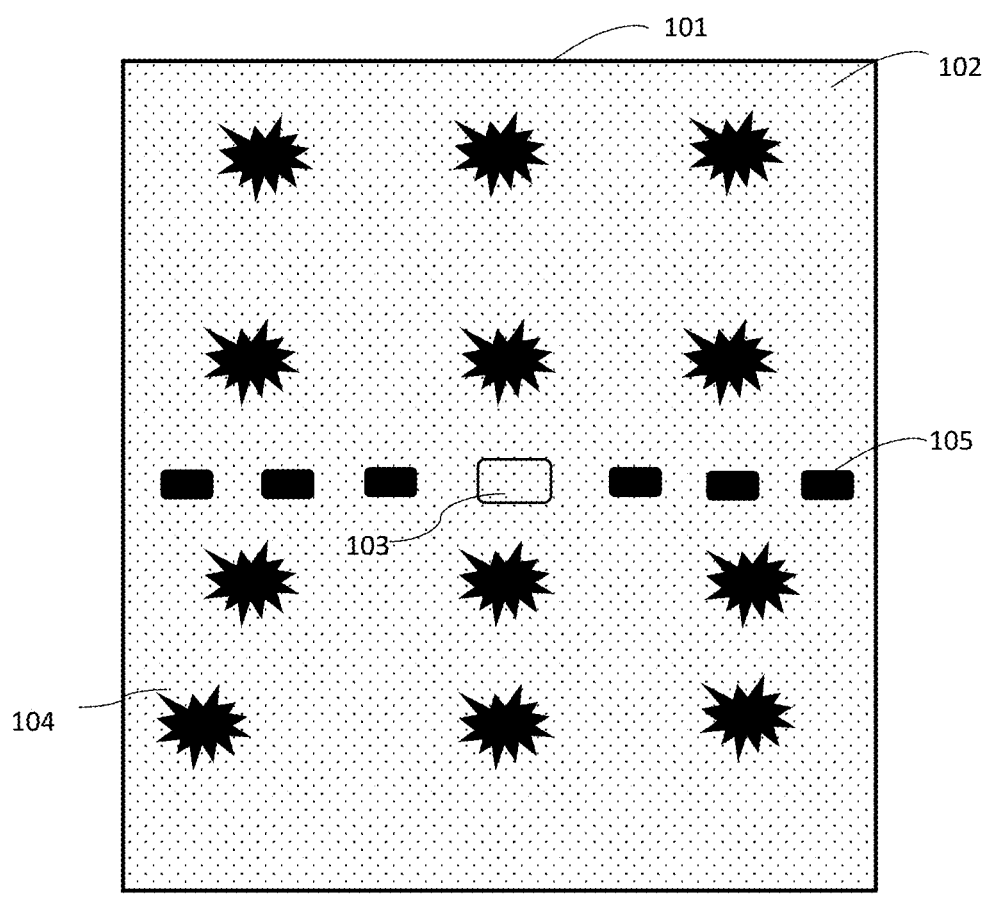
FIG. 1 is a schematic diagram illustrating a top view of a survey region with the various points of incidence of seismic sources according to an embodiment in this disclosure.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the disclosure.

Throughout the specification, the terms approach(es) and method(s) are used interchangeably and have the same meaning.

The present disclosure relates to building high resolution geological models by performing an improved seismic full waveform inversion to improve images of complex subsurface structures (formations) in a survey region by applying methods, apparatuses, and mediums including one or more source-independent misfit functions.

FIGS. 1-4 show exemplary embodiments of methods, apparatuses, and mediums for obtaining and storing the seismic data, which is processed to generate the one or more high resolution geological models for high resolution images for lithology identification, fluid discrimination, and reservoir characterization of complex subsurface structures of a survey region. The survey region may be subsurface structures under land or subsurface structures under the sea.

FIGS. 5-14 show exemplary embodiments of apparatuses, methods, and mediums to provide an improvement in the quality of seismic full waveform inversion results by using an improved seismic full waveform inversion technology to improve lithology identification, fluid discrimination, and reservoir characterization in the field of seismic exploration including the use of a computer-implemented seismic full waveform inversion approach. FIGS. 5-14 show exemplary embodiments of apparatuses, methods, and mediums for generating one or more high resolution geological models for high resolution images for lithology identification, fluid discrimination, and reservoir characterization of complex subsurface structures of a survey region. FIGS. 5-14 show exemplary embodiments that generate inverted model parameters, which are independent of source wavelet, and which are used to perform seismic full waveform inversion to generate high resolution geological models for high resolution images of a survey region including complex subsurface structures. FIGS. 5-14 show exemplary embodiments that are independent of the form of a source wavelet, and applicable to both acoustic full waveform inversion and elastic full waveform inversion to generate one or more high resolution geological models for high resolution imaging for lithology identification, fluid discrimination, and reservoir characterization of complex subsurface structures of a survey region. FIGS. 5-14 show exemplary embodiments of apparatuses, methods, and mediums to provide an improvement in the speed of obtaining seismic full waveform inversion results by using an improved seismic full waveform inversion technology that is independent of the form of a source wavelet, and applicable to both acoustic full waveform inversion and elastic full waveform inversion as well as to provide a reduction of computational resources in obtaining the seismic full waveform invention results.

FIG. 1 is a schematic diagram illustrating a top view of a survey region with the various points of incidence of seismic sources according to an embodiment. More specifically, FIG. 1 illustrates a seismic survey region (survey region) 101, which is a land-based region denoted by reference numeral 102. Reference numeral 102 denotes the top earth formation of the land-based region 102. Persons of ordinary skill in the art, will recognize that seismic survey regions produce detailed images of local geology to determine the location and size of possible hydrocarbon (oil and gas) reservoirs, and therefore a well location 103. In these survey regions, seismic waves bounce off underground rock formations during emissions from one or more seismic sources at various points of incidence 104. A blast is an example of a seismic source generated by seismic equipment. The seismic waves that reflect back to the surface are captured by seismic data recording sensors 105, transmitted by one or more data transmission systems (frequently wirelessly) from the seismic data recording sensors 105, and stored for later processing and analysis by a high-performance computing system. Although this example shows a top earth formation of a land-based region 102, it is understood that this is only an example and the methods and system may also be applied to a survey region at the bottom of an ocean.

Figure 2:
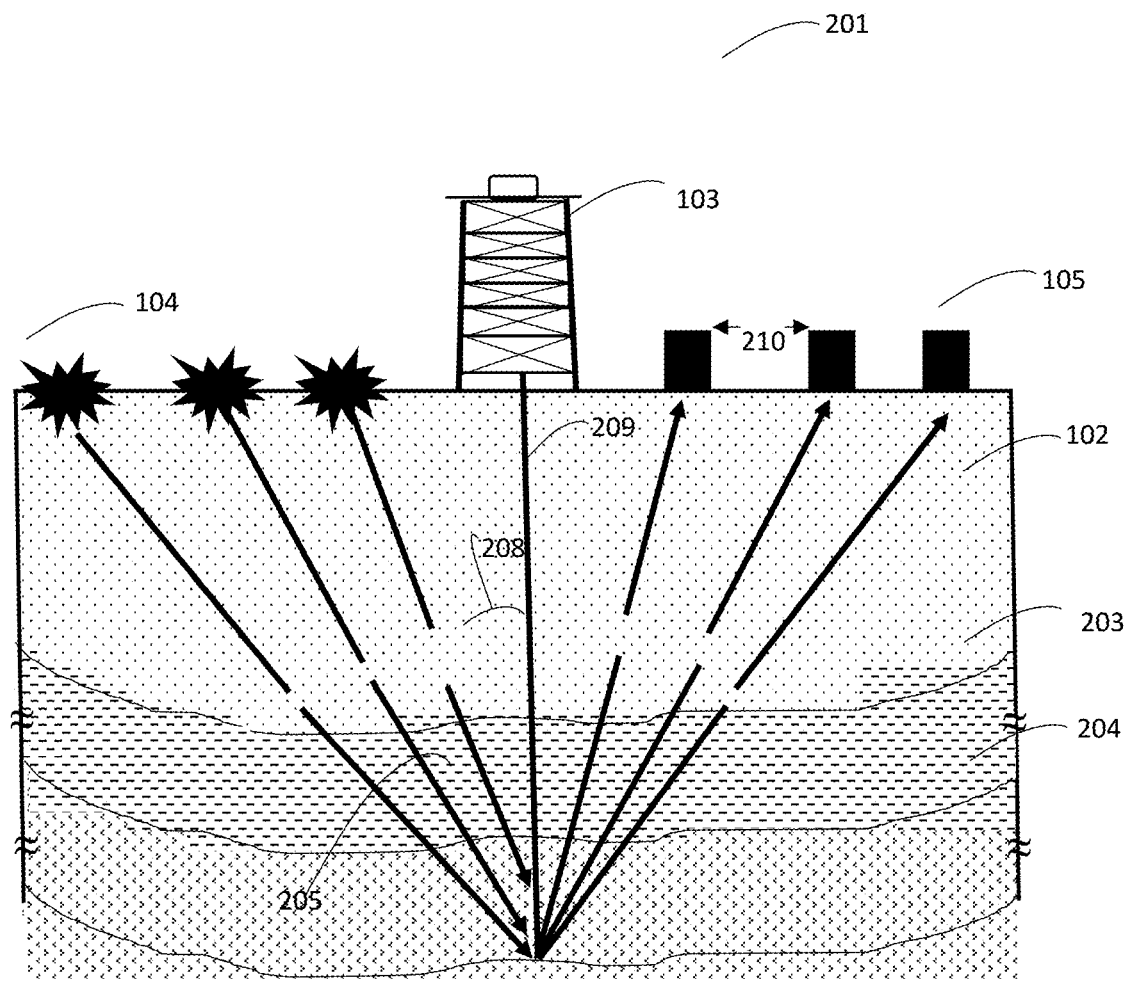
FIG. 2 is a schematic diagram illustrating a cross-sectional view of an environment with points of incidence of seismic sources, seismic data recording sensors, a well location, a wellbore, the various transmission rays, and the various angles of incidence, according to an embodiment.

FIG. 2 is a schematic diagram illustrating a cross-sectional view of a seismic survey region 101 in FIG. 1 with points of incidence of seismic sources, seismic data recording sensors (seismic receivers), a well location, a wellbore, the various transmission rays, and the various angles of incidence, according to an embodiment. More specifically, in FIG. 2 a cross-sectional view of a portion of the earth over the seismic survey region is denoted by reference numeral 201, showing different types of earth formations denoted by reference numerals 102, 203, and 204. Although the seismic survey region is based on land in this example, it is understood that this is only an example and that the methods and system may also be applied to a survey region at the bottom of an ocean. FIG. 2 illustrates a common midpoint-style gather, where seismic data are sorted by surface geometry to approximate a single reflection point in the earth. The survey seismic data may also be referred to as traces, gathers, or image gathers. In this example in FIG. 2, data from one or more shots or blasts and receivers may be combined into a single image gather or used individually depending upon the type of analysis to be performed.

As shown on FIG. 2, one or more shots or blasts represents seismic sources located at various points of incidence or stations denoted by reference numeral 104 at the surface of the Earth at which one or more seismic sources are activated. Seismic energy or seismic sources from multiple points of incidence 104, will be reflected from the interface between the different earth formations. These reflections will be captured by multiple seismic data recording sensors 105, each of which will be placed at different location offsets 210 from each other, and the well 103. Because all points of incidences 104, and all seismic data recording sensors 105 are placed at different offsets 210, the survey seismic data or traces, also known in the art as gathers or image gathers, will be recorded at various angles of incidence represented by 208. The points of incidence 104 generate downward transmission rays 205, in the earth that are captured by their upward transmission reflection through the seismic data recording sensors 105. Well location 103, in this example, is illustrated with an existing drilled well attached to a wellbore, 209, along which multiple measurements are obtained using techniques known in the art. This wellbore 209, is used to obtain well log data, which may include P-wave velocity, S-wave velocity, Density, among others. Other sensors, not depicted in FIG. 2, may be placed within the survey region to capture seismic data. Seismic data may be used to examine the dependence of amplitude, signal-to-noise, move-out, frequency content, phase, and other seismic attributes, on incidence angles 208, offset measurements 210, azimuth, and other geometric attributes that are important for data processing and imaging of a seismic survey region.

Figure 3:
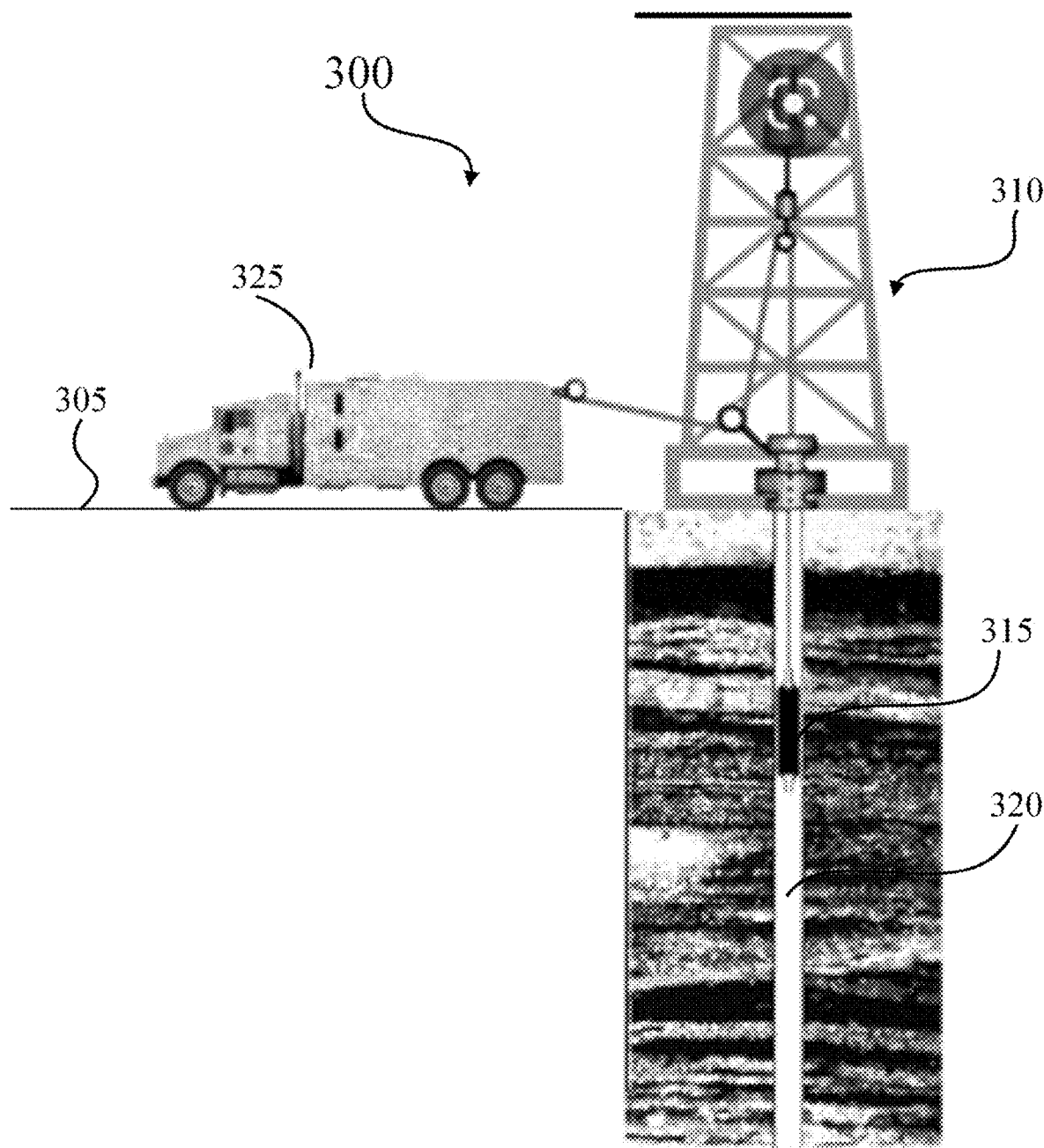
FIG. 3 is a schematic diagram illustrating a cross-sectional view of an environment with a wellbore and a well logging tool including one or more sonic generators and one or more well log data recording sensors according to an embodiment.

FIG. 3 is schematic diagram illustrating a cross-sectional view of a seismic survey region with a wellbore and well logging tool including one or more sonic generator and one or more well log data recording sensors according to an embodiment. A sonic generator is an example of equipment to produce one or more sonic waves (sound waves). A sonic generator may be referred to as a sonic source because the sonic generator produces or generates one or more sonic waves (sound waves) which are also referred to as seismic waves. The one or more well log data recording sensors are examples of one or more seismic data recording sensors (seismic receivers or seismic data recorders) and may be the same seismic data recording sensors as seismic data recording sensors 105. In embodiments of the present invention, oil and/or gas production is discontinued in order to generate seismic waves and record seismic data including reflections of the seismic waves moving through the subsurface of one or more earth formations in the seismic survey region.

FIG. 3 shows an oil drilling system 300 on land 305 including a drilling rig 310. The drilling rig 310 supports the lowering of a well logging tool 315 into a wellbore 320. The well logging tool 315 may include one or more sonic generators (sonic sources) to generate one or more sound waves, which are transmitted into one or more earth formations to generate reflections or reflection waves in the one or more earth formations. Although this example shows one or more earth formations of a land-based survey region, it is understood that this is only an example and that the methods and systems may also be applied to a survey region at the surface or bottom of a body of water such as an ocean. The well logging tool 315 also includes one or more well log data recording sensors. As discussed above, the one or more well log data recording sensors receive and record well log data, which includes reflection data received by the one or more well log data recording sensors in response to the sound waves transmitted into one or more earth formations by the one or more sonic generators. The well log data is an example of seismic data. The well log data may include compression wave velocity or P-wave velocity (Vp), shear wave velocity (Vs), and density, which is an indicator of porosity. This well logging process to record well log data may also be referred to as sonic logging. A vehicle 325 may be coupled to the well logging tool 315 to assist in the lowering and raising of the well logging tool 315 as well as communicating with the well logging tool 315 to obtain well log data. Alternatively, in methods and systems for a survey region at the surface or bottom of a body of water such as an ocean, another device or system may used to assist in the lowering or raising of the well logging tool 315 as well as communicating with the well logging tool 315 to obtain well log data.

Figure 4:
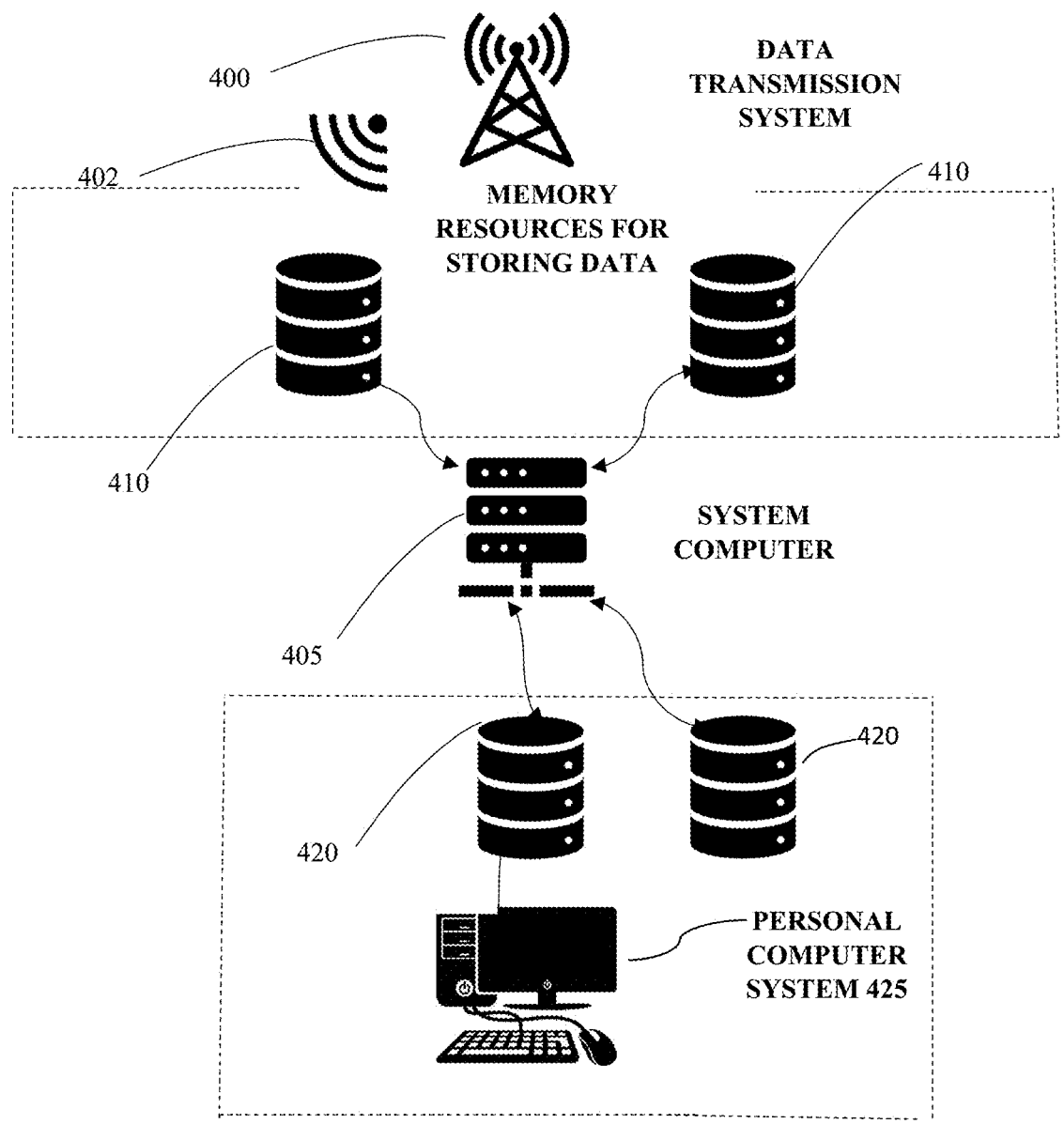
FIG. 4 is a schematic diagram illustrating a high-performance computing system according to an embodiment.

FIG. 4 is a schematic diagram illustrating a high-performance computer system according to an embodiment, which receives (frequently wirelessly) seismic data regarding seismic waves from the seismic data recording sensors 105 in FIGS. 1 and 2 and/or the seismic data recording sensors in FIG. 3, which are also referred to as well log data recording sensors in FIG. 3. The high-performance computer system in FIG. 4 stores the seismic data in at least one memory for later processing and analysis by computer implemented methods and apparatuses of one or more embodiments. The analyzed or processed seismic data may be accessed by a personal computer system. More specifically, FIG. 4 shows a data transmission system 400 for wirelessly transmitting seismic data from seismic data recording sensors to a system computer 405 coupled to one or more storage devices 410 to store the seismic data in databases. The data transmission system may also transmit wirelessly seismic data from seismic data recording sensors 405 directly to one or more storage devices 410 to store the seismic data in databases, which may be accessed by system computer 405. The wireless transmission is denoted by reference numeral 402. The one or more storage devices 410 may also store other computer software instructions or programs to implement apparatuses and methods described in embodiments. The system computer 405 may be coupled (e.g., wirelessly coupled) to one or more output storage devices 420, which may receive the results of computer implemented processes or methods performed by the system computer 405. A personal computer 425 may be coupled (e.g., wirelessly coupled) to one or more output storage devices 420 and/or to the computer system 305 so that a user may utilize a user interface of the personal computer 425 to input information or obtain the results of the computer implemented processor methods performed by the system computer 405. The one or more storage devices 420 may also store other computer software instructions or programs to implement apparatuses and methods described in embodiments.

A user interface of the personal computer 425 may include, for example, one or more of a keyboard, a mouse, a joystick, a button, a switch, an electronic pen or stylus, a gesture recognition sensor (e.g., to recognize gestures of a user including movements of a body part), an input seismic device or voice recognition sensor (e.g., a microphone to receive a voice command), an output seismic device (e.g., a speaker), a track ball, a remote controller, a portable (e.g., a cellular or smart) phone, a tablet PC, a pedal or footswitch, a virtual-reality device, and so on. The user interface may further include a haptic device to provide haptic feedback to a user. The user interface may also include a touchscreen, for example. In addition, a personal computer 425 may be a desktop, a laptop, a tablet, a mobile phone or any other personal computing system.

Processes, functions, methods, and/or computer software instructions or programs in apparatuses and methods described in embodiments herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The one or more databases may include a collection of data and supporting data structures which may be stored, for example, in the one or more storage devices 410 and 420. For example, the one or more storage devices 410 and 420 may be embodied in one or more non-transitory computer readable storage media, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage devices 410 and 420 are not limited to the above description, and the storage may be realized by other various devices and structures as would be understood by those skilled in the art.

Figure 5:
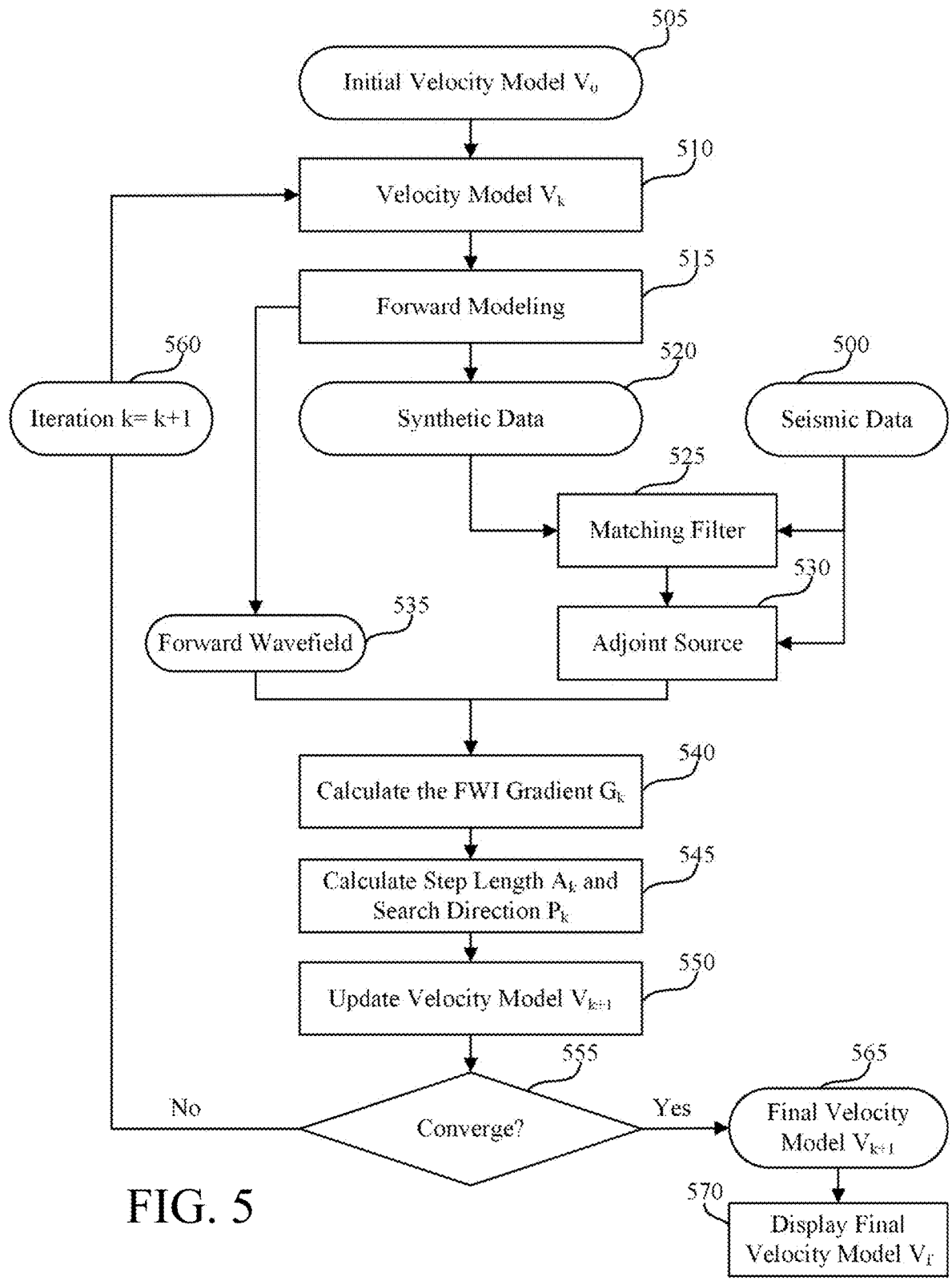
FIG. 5 is a flowchart illustrating seismic full waveform inversion method to generate a final velocity model to improve images of complex subsurface structures in a survey region in an embodiment.

FIG. 5 is a flowchart illustrating a seismic full waveform inversion method independent of a source wavelet to generate a final velocity model to improve images of complex subsurface structures in a survey region according to an embodiment. FIG. 5 shows an embodiment seismic full waveform inversion method, which is applicable to both acoustic full waveform inversion and elastic full waveform inversion in an isotropic or anisotropic medium. FIG. 5 shows an embodiment to generate the one or more high resolution geological models to generate high resolution images for lithology identification, fluid discrimination, and reservoir characterization of complex subsurface structures of a survey region. The survey region may be subsurface structures under land or subsurface structures under the sea.

As discussed above, the full waveform invention (FWI) is an optimization problem and is a highly nonlinear process, and its success in a real field application depends on many factors such as the choice of the wave equation and the source wavelet. This approach in FIG. 5 mitigates the dependence of the source wavelet in full waveform inversion (FWI) techniques for seismic exploration of subsurface formations. FWI is a data-driven tool to automatically build velocity models by iteratively minimizing the difference between recorded data and modeled synthetic data. Generating the synthetic data requires not only the choice of the wave equation and the initial models, but also the source wavelet. These are all unknown. A small error in the source wavelet may lead to large discrepancies in the inverted model, which accumulates as the depth increases. Therefore, an accurate source wavelet estimation becomes crucial in a successful FWI. Even with a correct wave equation, an inaccurate initial model and/or an inaccurate source wavelet can lead the inversion to fail. The approach in FIG. 5 focuses on reducing or eliminating the dependence of source wavelet choice, assuming the chosen wave equation (acoustic or elastic) is accurate enough to describe the wave propagation with good enough initial model parameters. The approach in FIG. 5 mitigates the source wavelet dependence by matching the synthetic data to the real data with a Wiener filter in each FWI iteration and by calculating an adjoint source by performing both correlation and convolution operations on the results of the matching operation.

Referring to the seismic full waveform inversion method of FIG. 5, seismic data (observed seismic data), which is denoted by reference numeral 500 and which is the seismic data detected in the survey region (observed seismic data), may be input into this seismic full wave inversion method of FIG. 5. For example, the seismic data recording sensors 105 in FIG. 2 and/or the well log data recording sensors of the well logging tool 315 in FIG. 3 may detect the seismic data 500 and transmit the seismic data 500 to the high-performance computing system shown in FIG. 4. As discussed above in FIGS. 1-4, the seismic data 500 detected in the survey region may be stored in one or more memories such as one or more storage devices 410 and one or more output storage devices 420. Further, an initial velocity model $V_0$ denoted by reference numeral 505 may be input into the seismic full waveform inversion method as shown in FIG. 5. The initial velocity model $V_0$ 505 may be a P-wave velocity model, an S-wave velocity model (elastic model), a density model, an anisotropic model which may be Thomsen's anisotropy parameters epsilon (long offset effect) and delta (short offset effect), or a combination of the above models. It is understood that an initial velocity model may be a group of parameters. This initial velocity model $V_0$ 505 may be a predetermined velocity model based on established scientific norms. This initial velocity model $V_0$ 505 may be input by a user through a user interface such as the user interface of the personal computer 425 or may be stored in one or more memories such as one or more storage devices 410 and one or more output storage devices 420. For simplicity, in an exemplary embodiment, the initial velocity model $V_0$ 505 is a P-wave velocity model in an isotropic acoustic case or P-wave velocity model, together with the Thomsen's anisotropy parameters epsilon (long offset effect) and delta (short offset effect) models in an anisotropic acoustic case. However, the seismic full waveform inversion method of FIG. 5 is also applicable to other models such as an S-wave velocity model, which is an elastic model.

As shown in the seismic full waveform inversion method of FIG. 5, there is an initial model such as initial velocity model $V_0$ 505, which is input into a loop. In operation 510, the current velocity model is determined. Initially, velocity model $V_k$ is the velocity model $V_0$ 505, which in this example is an initial P-wave velocity model. The variable k denotes an iteration number for the loop. Accordingly, k=0 initially. In each iteration in FIG. 5 denoted by reference 560, velocity model velocity model $V_k$ is updated in operation 510. For example, after the first iteration, the velocity model will be $V_1$, where k=1. After the second iteration, the velocity model will be $V_2$, wherein k=2. Iterations 560 will continue until a convergence is detected in operation 555. After convergence is detected in operation 555, the Final Velocity Model denoted by reference numeral 565, which corresponds to the most recent velocity in operation 550, is output and then displayed in operation 570. Operations 550 and 555 will be described in more detail below.

Figure 6:
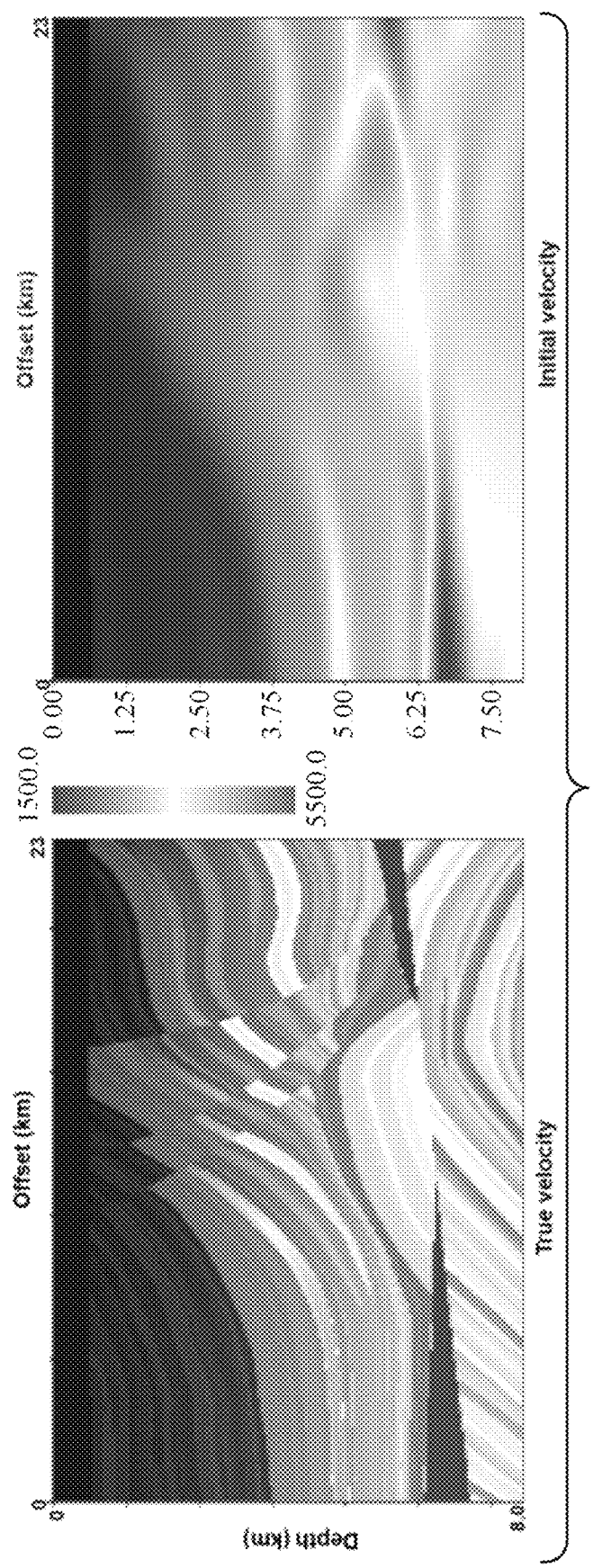
FIG. 6 is a map showing a comparison of an example of a true velocity model of a P-wave in a cross-section of a survey region and an example of a predetermined initial velocity model of a P-wave in a cross section of a survey region.

Referring to FIG. 6, FIG. 6 is a map showing an example of a true P-wave velocity model in a cross-section of a survey region (left side of FIG. 6), and an example of a predetermined initial P-wave velocity model in a cross section of a survey region right side of FIG. 6), which corresponds to the input initial velocity model $V_0$. As discussed above, the input initial velocity model $V_0$ is input into the seismic full waveform inversion method of FIG. 5, which includes a loop to provide an improved approximation to the true velocity. Although the true velocity is shown as an example in FIG. 6, the true velocity in the real world is not precisely known. The seismic full waveform inversion in FIG. 5 generates an estimated (approximate) velocity model, which is as close as possible to the true velocity model in FIG. 6. In FIG. 6, the vertical axis represents the depth of the survey region, and the horizontal axis represents the offset (km), which refers to a horizontal distance from the origin (0 km). The grayscale in the velocity models of FIG. 6 denote velocity at a given location in the survey region.

Figure 7:
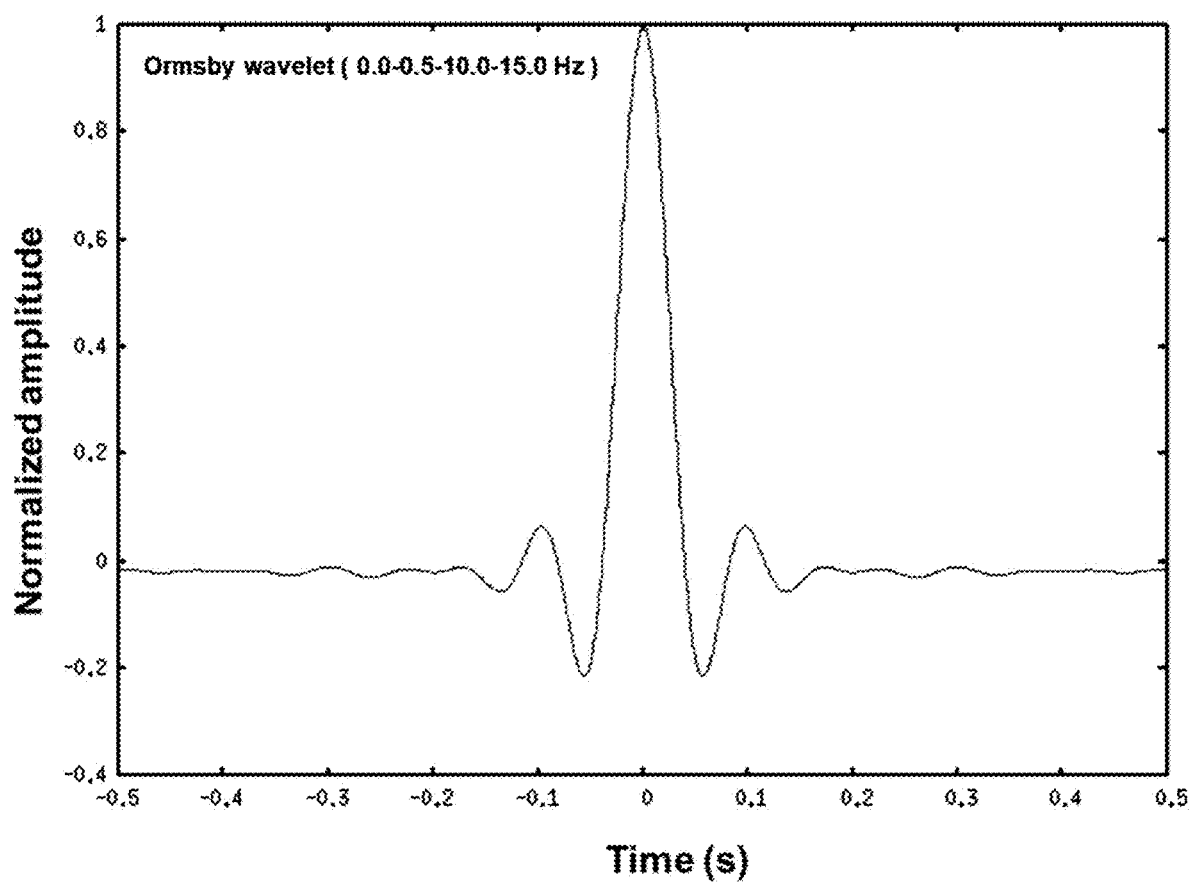
FIG. 7 is an example of a source wavelet used in a forward modeling operation of an embodiment.
Figure 8:
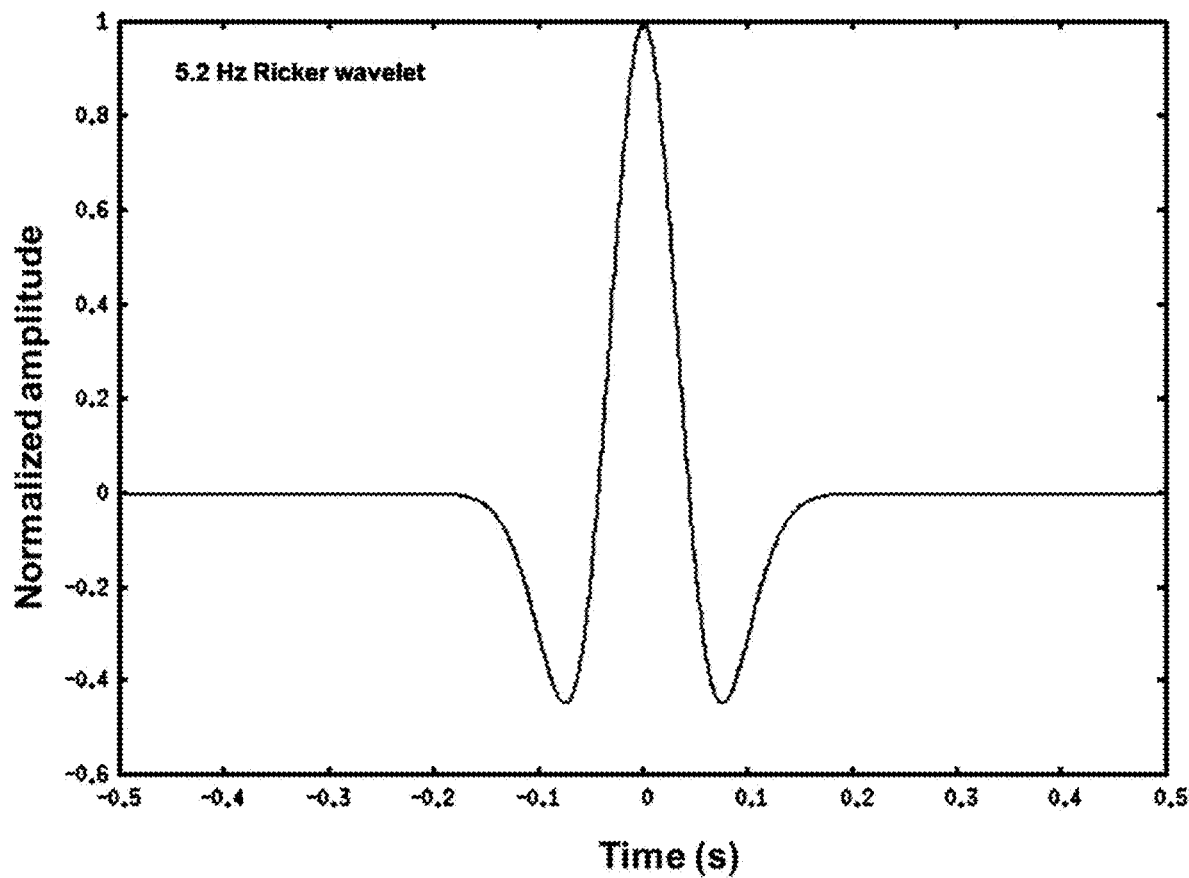
FIG. 8 is an example of a source wavelet used in a forwarding modeling operation of an embodiment.

Referring to operation 515 in the seismic full waveform inversion method of FIG. 5, the velocity model $V_k$ is input into operation 515 for forward modeling. Forward modelling of seismic data is a technique that creates (generates) synthetic seismic data from geological information, which in this case is the velocity model $V_k$. The forward modeling operation requires a source wavelet. A source wavelet may be a known source wavelet independent from the seismic survey being conducted or analyzed. An example of a source wavelet used in a forward modeling operation in accordance with an embodiment is shown in FIG. 7. The source wavelet in FIG. 7 may be referred to as the Ormsby wavelet. Another example of a source wavelet used in a forward modeling operation accordance with an embodiment is shown in FIG. 8. The source wavelet in FIG. 8 may be referred to as the Ricker wavelet. The source wavelet (Ormsby wavelet) as shown in FIG. 7 is very different from the source wavelet (Ricker wavelet) shown in FIG. 8. The source wavelet is used in the forward modeling operation to generate synthetic data based on the velocity model $V_k$. Synthetic data is denoted by reference numeral 520, and represents synthetic data output by the forward modeling operation 515.

The synthetic data[1] 520 is input into a matching filter 525. For example, the synthetic data is based upon the input initial velocity model $V_0$. In addition, the forward modeling operation 515 generates and outputs a forward wavefield, which is denoted by 535, which will be discussed in more detail below.

Referring to the matching filter 525, both seismic data $D^{obs}$ 500 detected in the survey region and calculated synthetic data 520 are input into the matching filter 525. An example of a matching filter 525 may be a Wiener filter, which matches calculated synthetic data 520 with seismic data $D^{obs}$ 500 detected by seismic data recording sensors such as the seismic data recording sensors 105 in the survey region and the well log data recording sensors positioned in the wellbore of the survey region by the well logging tool 315. The matching filter 525 matches the phase and amplitude of the synthetic data 520 with the phase and amplitude of the seismic data 500. The matching filter 525 is determined in each iteration 560 using the calculated synthetic data 520, so that the velocity model $V_k$ 510 may ultimately be updated. Convolving the seismic data 500 with synthetic data 520 produces a matched synthetic data similar to the seismic data 500 detected in the survey region.

As discussed above, a small error in this source wavelet may ultimately lead to large discrepancies in the inverted model, which accumulates as the depth from the surface increases. Therefore, an accurate source wavelet estimation becomes one of crucial factors in a successful FWI in real field application when using the least-squares misfit function (Equation 2) in practice. A typical procedure of such an estimation is to window the first arrival event in the data and stack this event to serve as the source wavelet. This estimate source wavelet will not change during the iterative process. However, an accurate estimation of the source wavelet in industrial field application is difficult to achieve because of the poor repeatability of the source signature from shot to shot (blast to blast or sonic source to sonic source), the coupling uncertainty of the source and the earth, as well as the coupling of the receivers and the earth. Therefore, a great effort has been spent on the source-independent misfit function methodologies to overcome such problems. The matching filter operation 525 combined with other operations such as adjoint source 530 in FIG. 5 solve these problems.

More specifically, the matching filter operation 525 modifies the least-squares misfit function in Equation (2) as shown in Equation (3) below:

$$\min_m C(m) = \sum_{s=1}^{N_s}\sum_{r=1}^{N_r}\int_0^T dt |d_{obs,s,r}(t) - M_s(t) * d_{syn,s,r}(m;t)|^2, \quad (3)$$

where * denotes a convolution operator, and $M_s(t)$ is a matching filter by matching the synthetic data to the real data with a least squared Wiener filter $$M_s(t) = \text{Inverse Fourier Transform}\left[\frac{\sum_{r=1}^{N_r} d_{syn,s,r}^\dagger(\omega) d_{obs,s,r}(\omega)}{\sum_{r=1}^{N_r} d_{syn,s}^\dagger(\omega) d_{syn,s}(\omega) + \epsilon}\right], \quad (4)$$

where $d_{obs,s,r}(\omega)$ and $d_{syn,s,r}(\omega)$ are Fourier transform of the time observed and synthetic data, and where c is a small regularization factor. Accordingly, the formula for the matching filter 525 in Equation (3) is adjusted in each iteration to minimize the misfit function.

Referring to the adjoint source operation 530, the adjoint source operation 530 calculates one or more adjoint sources. The adjoint source operation 530 includes the following formula:

$$f_{adj,s}(t) = \sum_{r=1}^{N_r} M_s(t) \otimes [d_{obs,s,r}(t) - M_s(t) * d_{syn,s,r}(m;t)], \quad (5)$$

where $\otimes$ denotes the cross-correlation operator. The Wiener matching filter $M_s(t)$ is determined in each iteration using the obtained synthetic data $d_{syn,s,r}(m_k; t)$ explicitly associated with the updated model parameter $m_k$. The adjoint source operation 530 outputs an adjoint source so that the FWI gradient $G_k$ may be calculated in operation 540. The sign * represents convolution (e.g., $M_s(t)*d_{syn,s,r}(m; t)$ denotes that $M_s(t)$ is convolved with $d_{syn,s,r}(m; t)$).

Because both correlation and convolution are parts of this adjoint source operation 530 as shown in equation (5), the calculation of the FWI gradient $G_k$ in operation 540 may be performed using the forward wavefield 535 generated by the forward modeling operation 515 and the adjoint source of the adjoint source operation 530. In conventional seismic full waveform inversion methods, an additional forward modeling operation using an updated source wavelet must be performed after the operation matching the calculated synthetic data 520 with seismic data 500 in order to provide a matching forward wavefield to conventional adjoint source operation 530 as input to the FWI gradient $G_k$ operation 540. Therefore, the adjoint source operation 530 in Equation (5) substantially increases computing efficiency and substantially reduces computer resource in each iteration k of the seismic full waveform inversion method of FIG. 5. As indicated above, there is no need to use an updated source wavelet in workflow in FIG. 5, the seismic full waveform inversion method becomes independent of the source wavelet. The matching filter operation 525 and the adjoint source operation 530 remove the need of an updated source wavelet in forward modeling operation 515 of the conventional FWI workflow.

This approach generates the inverted model parameters that are independent of the choice of this wavelet. This method thus overcomes one of the major deficiencies of full waveform inversion (FWI) in order to build high resolution geological models to improve images of complex subsurface structures in a survey region to improve lithology identification, fluid discrimination, and reservoir characterization in the field of seismic explorations Accordingly, the forward modeling operation 515 outputs synthetic data 520 as discussed above. In addition, the forward modeling operation 515 outputs a forward wavefield 535, which is a three-dimensional wavefield in each forward modeling time step. Because the forward wavefield 535 is generated once in forward modeling operation 515 per iteration 560 instead of twice per iteration as in conventional seismic full waveform inversion methods, the seismic full waveform inversion method of FIG. 5 provides a substantial increase in computing speed to compute the final velocity model and a substantial decrease in computing resources required to compute the final velocity model. In the conventional seismic full waveform inversion method, the forward modeling operation must be performed before the match filtering operation and after a match filtering operation with two different source wavelets to produce an updated or new forward wavefield after the match filtering operation. Accordingly, the conventional seismic full waveform inversion method is dependent on the updated source wavelet. However, an embodiment in FIG. 5 shows a seismic full waveform inversion method, which is independent of the updated source wavelet used in forward modeling operation 515. Another advantage of the seismic full waveform inversion method of FIG. 5 is the increase in resolution of the images produced by the operations in FIG. 5.

Based upon the adjoint source output by the adjoint source operation 530 and the forward wavefield 535, the FWI gradient $G_k$ is generated in operation 540. $G_k$ may be referred to as $G_k(x)$ where k represents the iteration number. Referring to the calculation of the FWI gradient $G_k$ in operation 540, operation 540 reversely propagates the one or more adjoint sources generated by equation (5) to obtain an adjoint wavefield using equation (6), which has the following formula:

$$F^\dagger(m; x)u_s(x, t) = f_{adj,s}(t), \quad (6)$$

where $F^\dagger(m; x)$ is the adjoint operator of forward model operator $F(m; x)$; $f_{adj,s}(t)$ is the adjoint source; and $u_s(x, t)$ is the adjoint wavefield.

Using the forward wavefield 535 and the adjoint wavefield above, one obtains a gradient for each iteration using the following formula:

$$G(x) = \sum_{s=1}^{N_r} \int_0^T dt \left( \frac{\partial F(m; x)}{\partial m} w_s(x, t) \right)^T u_s(x, t), \quad (7)$$

where $F(m,x)$ wave-equation forward operator; $w_s(x,t)$ is forward wavefield; $u_s(x,t)$ is backward adjoint wavefield from Equation (6). The gradients in Equation (7) from different shots (blasts or sonic generators) are summed and stacked to get a single gradient in operation 540. The gradient $G_k$ is then used to minimize the misfit function by updating the models musing inversion methods as discussed below with respect to operation 545.

Operation 545 determines (1) the magnitude of increase of the estimated velocity toward the true velocity model or the magnitude of the decrease of the estimated velocity model and (2) whether the estimate of the velocity model should increase to improve the approximation of the true velocity model or the estimate of the velocity model should decrease to improve the approximation of the true velocity model.

More specifically, once a gradient is calculated and output by operation 540, a step length $A_k$ and a search direction $P_k$ are calculated in operation 545 using inversion methods. For example, starting an initial guess of the subsurface parameters $m_{k=0}$, the model at iteration k+1 is updated as $$m_{k+1} = m_k + A_k P_k k = 0, 1, \ldots, \quad (8)$$

where $P_k$ is called the search direction and $A_k$ is a step length. The search direction P is obtained from the gradient (Equation 7) in a way to minimize the cost function, a process called inversion. The simplest inversion method is called the steepest-descent algorithm, in which the search direction $P_k$ is simply given by the negative gradient of the objective at iteration k:

$$P_k = -G_k. \qquad (9)$$

Referring to the step length $A_k$ operation 545, the step length $A_k$ and search direction $P_k$ operation 545 receives the gradient and determines the both the magnitude of increase or decrease of the estimated velocity toward the true velocity model as well as the direction (increase or decrease) of the estimated velocity model. Accordingly, the step length $A_k$ and search direction $P_k$ operation 545 scales the output of FWI gradient $G_k$ operation 540, so that an optimum magnitude of the directional increase of the estimated velocity model is provided to avoid too large an increase/decrease in the estimated velocity model (which would substantially increase the number of iterations) or too small an increase/decrease in the estimated velocity model (which would substantially increase the number of iterations). Thereafter, the velocity model $V_k$ is updated in operation 550 based on the following formula:

$$V_{k+1} = V_k - A_k G_k. \qquad (10)$$

Referring to the convergence operation 555, the seismic full waveform inversion method determines whether an additional iteration denoted is required. If an additional iteration is required, then the numerical value of k is increased in operation 560 and the update velocity model $V_{k+1}$ becomes the velocity model $V_k$ in operation 520. In an embodiment, operation 550 may set a maximum number of iterations k. A maximum number of iterations may be in the range of 10 to 40. Once the number of iterations represented by k equals a predetermined maximum number of iterations, then the seismic full waveform inversion method of FIG. 5 is considered to have converged and the final velocity model $V_F$, which is the same as the last updated velocity model $V_{k+1}$ determined in operation 550, is output. The final velocity model $V_F$ may be denoted by 565. In an embodiment, the operation 550 may also set an additional threshold based on the difference between the current update velocity output in operation 550 and the immediately preceding velocity output in operation 550. If the difference is greater than (or greater than or equal to) a threshold, then the next iteration 560 may proceed provided that the maximum number of iterations has not been exceeded. However, if the different is less than (or lass than or equal to) a threshold, then the seismic full waveform inversion method of FIG. 5 is considered to have converged and the final velocity model $V_F$, which is the same as the last updated velocity model $V_{k+1}$ determined in in operation 550, is output. The final velocity model $V_F$ may be denoted by 565. An image of final velocity model $V_F$ may be displayed in operation 570. For example, the personal computer system 425 may display an image of the final velocity model $V_F$.

A synthetic and a real field data inversion example is provided below to demonstrate the feasibility and robustness of the approach discussed in FIG. 5 by referring to FIGS. 7-14 for an improved seismic full waveform inversion independent of a source wavelet. Although the embodiments described below pertain to a source-independent misfit function in a wave propagation utilizing finite-difference approximation of a scalar acoustic wave equation, embodiments also include source-independent misfit function used with vector wave equations and elastic wave equations in both isotropic and anisotropic media.

Figure 9:
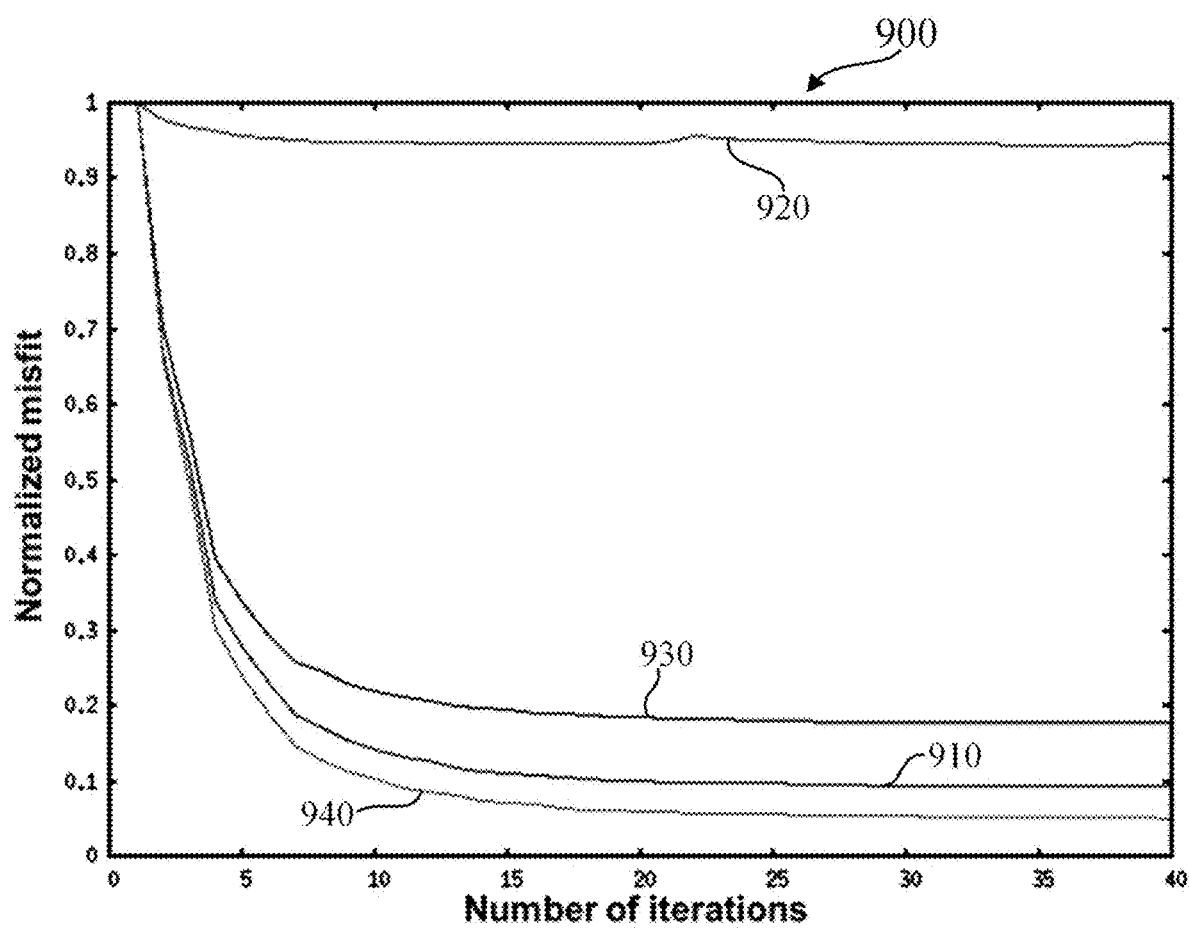
FIG. 9 is a graph showing a comparison of convergence using different source wavelets in forward modeling operations.

For example, FIG. 9 is a graph denoted by reference numeral 900 showing a comparison of convergences using different source wavelets shown in FIG. 7 and FIG. 8 in forward modeling operations. The conventional seismic full waveform inversion method uses a least squares misfit function. However, embodiments of a seismic full waveform inversion method use a source independent misfit function, which allows embodiments performing the seismic full wave form inversion method to provide excellent performance independent of the source wavelet. If the source wavelet shown in FIG. 7 is applied to a conventional seismic full waveform inversion method, the convergence is the line denoted by reference numeral 910. If the source wavelet shown in FIG. 8 is applied to a conventional seismic full waveform inversion method, the convergence is the line denoted by reference numeral 920. If the source wavelet shown in FIG. 7 is used in the forward modeling operation 515 in a seismic full waveform inversion method of an embodiment, the convergence is denoted by reference numeral 930. If the source wavelet shown in FIG. 8 is used in the forward modeling operation 515 in a seismic full waveform inversion method of an embodiment, the convergence is denoted by reference numeral 940.

As indicated in FIG. 9, there is a wide disparity in the number of iterations to reach convergence in the conventional seismic full waveform inversion method as shown by the lines denoted by reference numerals 910 and 920, which shows that convergence is dependent upon the selected source wavelet and the error rate varies greatly. With the use of the source-independent misfit function in embodiments, operations 930 and 940 both show excellent convergence regardless of the source wavelet with low error rates, which demonstrates that the seismic full waveform inversion method of embodiments is independent of the source wavelet. As discussed above, this greatly improves computing efficiency and reduces the amount of computer resources needed to perform a seismic full waveform inversion. In addition, when the selected source wavelet for the forward modeling operation is the source wavelet of FIG. 8, the misfit (error) as depicted in the line denoted by reference numeral 940 (conventional seismic full waveform inversion using source wavelet shown in FIG. 8) is much greater than the misfit (error) as depicted in the line denoted by reference numeral 920 (embodiment of seismic full waveform inversion using source wavelet shown in FIG. 8).

Figure 10:
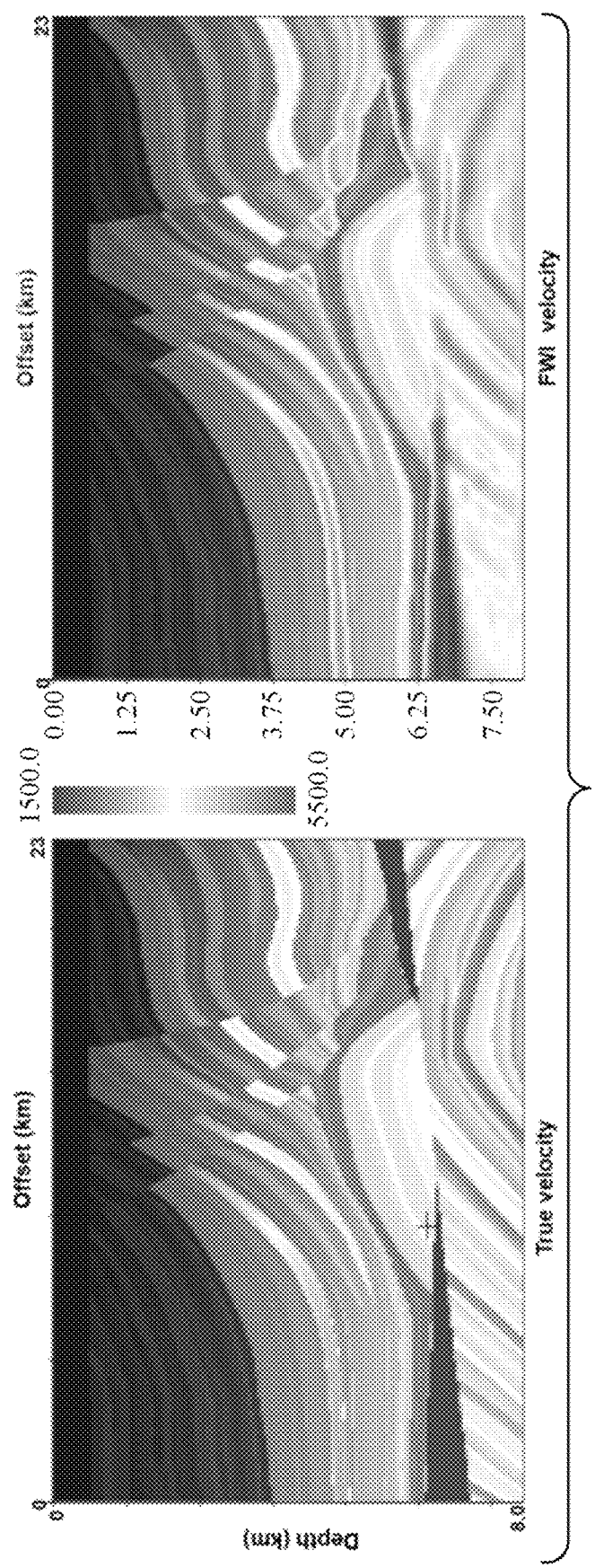
FIG. 10 is a map showing an example of a true velocity model of a P-wave in a cross-section of a survey region in comparison with a velocity model of a P-wave in a cross section of a survey region using the conventional seismic full waveform inversion method.

FIG. 10 is a map showing an example of a true P-wave velocity model in a cross-section of a survey region in comparison with a P-wave velocity model in a cross section of a survey region using the conventional seismic full waveform inversion method. The left side is the image of the true velocity model for the P-wave velocity, and the right side is the image of the P-wave velocity generated by the conventional seismic full waveform inversion model using the Ormsby wavelet (FIG. 7). FIG. 10 shows the best final P-wave velocity which the conventional full wave inversion can provide for the given initial P-wave velocity model in FIG. 6 when there is no error on the source wavelet. In FIG. 10, the vertical axis represents the depth of the survey region, and the horizontal axis represents the offset (km), which refers to a horizontal distance from the origin (0 km). The grayscale in the velocity models of FIG. 10 denote velocity at a given location in the survey region. As discussed above, a small error in this source wavelet may lead to large discrepancies in the inverted model, which accumulates as the depth increases. Accordingly, FIG. 10 is the best-case scenario that a conventional full wave inversion can provide, because selection of a source wavelet with no error may not occur and provide a poor model.

Figure 11:
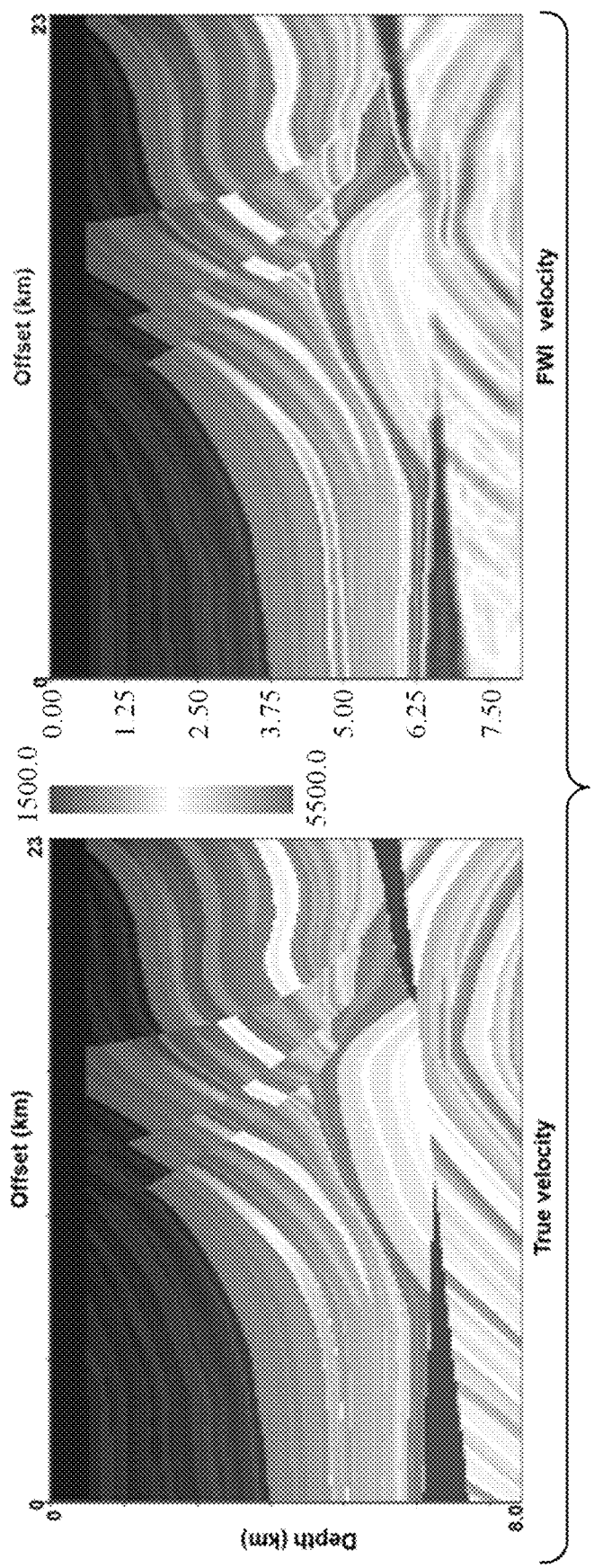
FIG. 11 is a map showing an example of a true velocity model of a P-wave in a cross-section of a survey region in comparison with a velocity model of a P-wave in a cross section of a survey region using an embodiment of a seismic full waveform inversion method and a source wavelet.

FIG. 11 is a map showing an example of a true P-wave velocity model in a cross-section of a survey region in comparison with a P-wave velocity model in a cross section of a survey region using an embodiment of a seismic full waveform inversion method and a source wavelet. The left side is the image of the true velocity model for the P-wave velocity, and the right side is the image of the P-wave velocity generated by the seismic full wave inversion method (Final Velocity $V_f$ denoted by 565 in FIG. 5) of an embodiment using the Ormsby wavelet (FIG. 7). In FIG. 11, the vertical axis represents the depth of the survey region, and the horizontal axis represents the offset (km), which refers to a horizontal distance from the origin (0 km). The grayscale in the velocity models of FIG. 11 denote velocity at a given location in the survey region.

Figure 12:
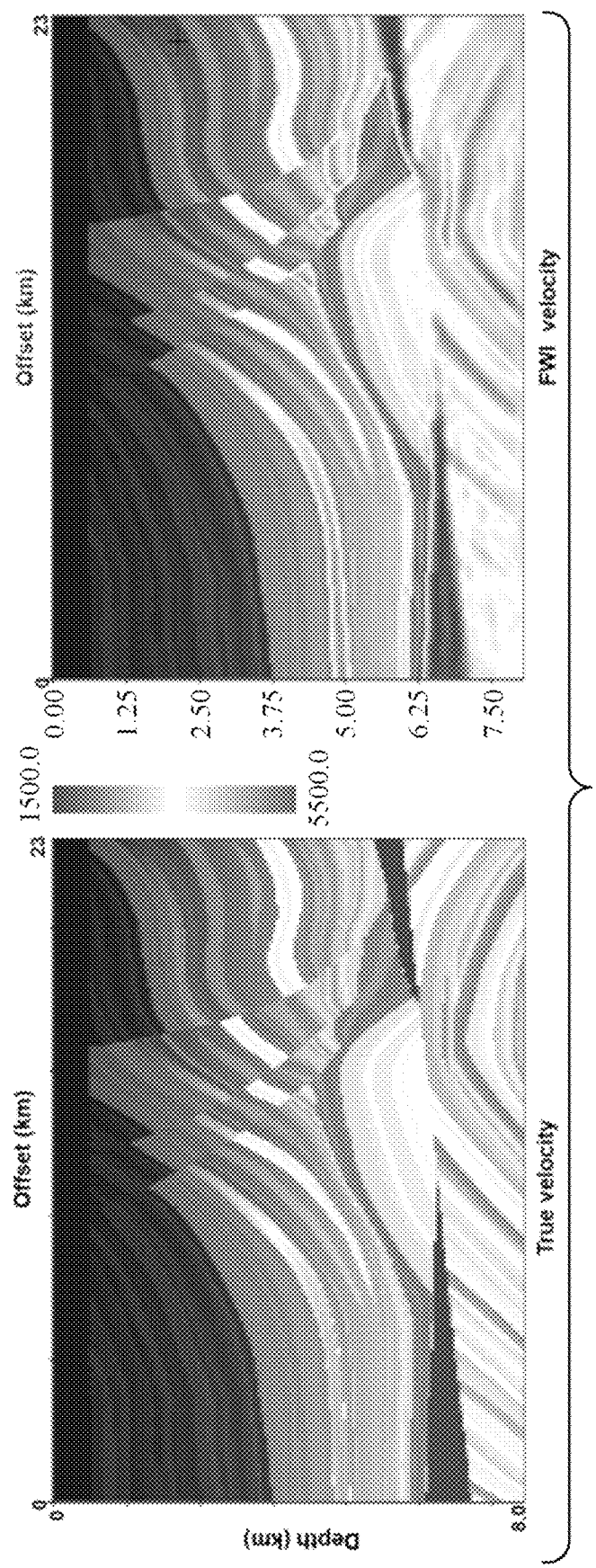
FIG. 12 is a map showing an example of a true velocity model of a P-wave in a cross-section of a survey region in comparison with a velocity model of a P-wave in a cross section of a survey region using an embodiment of a seismic full waveform inversion method and a different source wavelet.

FIG. 12 is a map showing an example of a true P-wave velocity model in a cross-section of a survey region in comparison with a P-wave velocity model in a cross section of a survey region using an embodiment of a seismic full waveform inversion method and a different source wavelet. The left side is the image of the true P-wave velocity model, and the right side is the image of the P-wave velocity generated by the seismic full wave inversion method (Final Velocity $V_f$ denoted by 565 in FIG. 5) of an embodiment using the Ricker wavelet (FIG. 8). In FIG. 12, the vertical axis represents the depth of the survey region, and the horizontal axis represents the offset (km), which refers to a horizontal distance from the origin (0 km). The grayscale in the velocity models of FIG. 12 denote velocity at a given location in the survey region.

As shown in FIGS. 11 and 12, an excellent image of the Final Velocity $V_f$ denoted by 565 in FIG. 5 is generated for display such as the personal computing system 425 as compared with the true P-wave velocity in both the Ormsby wavelet (FIG. 7) and the Ricker wavelet (FIG. 8), which demonstrates that the seismic full waveform inversion method of embodiments generates excellent images independent of the source wavelet used in the seismic full waveform invention. In addition, the images of the Final Velocity $V_f$ in FIGS. 11 and 12 are comparable to the image of the velocity produced by the conventional full waveform inversion method in FIG. 10, where no error on the source wavelet.

Figure 13:
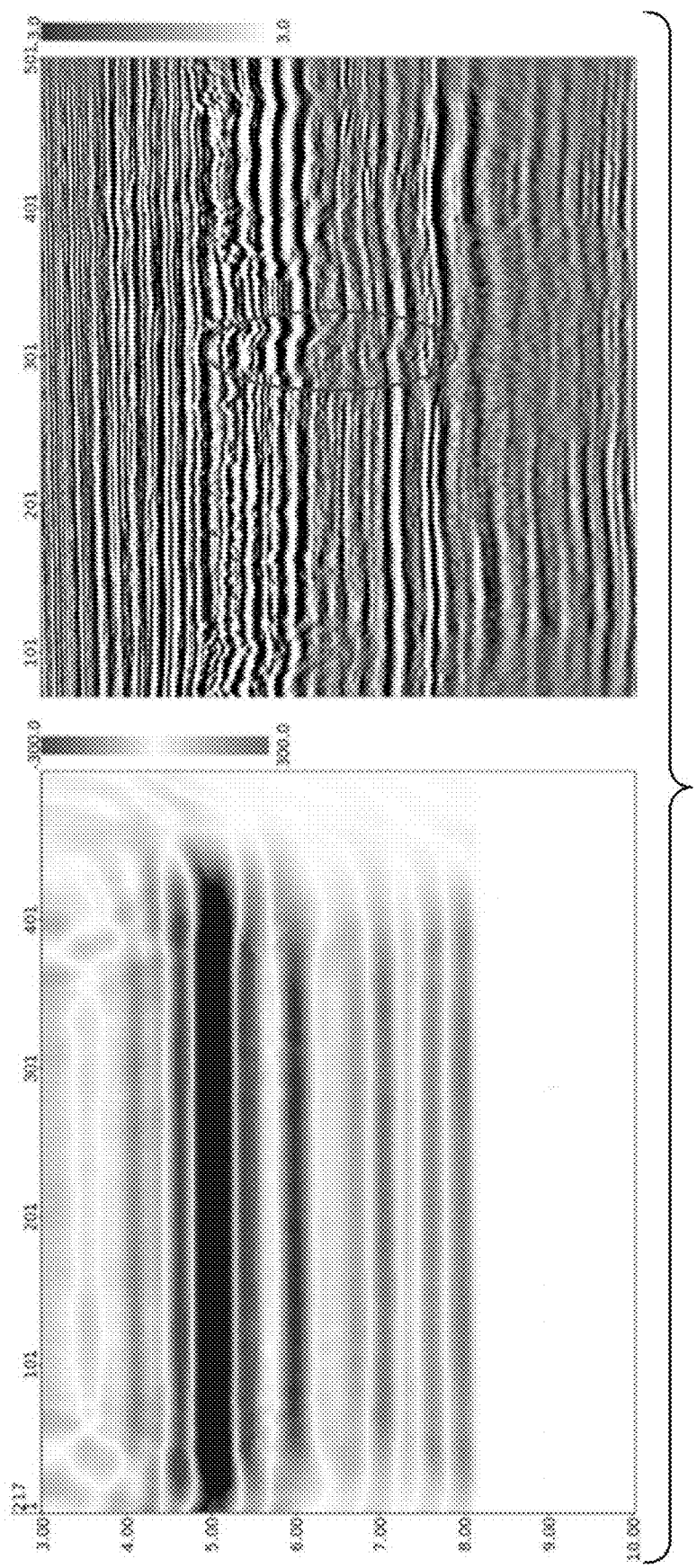
FIG. 13 is a map of updated velocity in a conventional seismic full waveform inversion method and a reverse-time migration image using the conventional seismic full waveform inversion method.

FIG. 13 is a map of updated velocity in a conventional seismic full waveform inversion method and a reverse-time migration image using the conventional seismic full waveform inversion method on field data. Based on an updated velocity in a map of the conventional seismic waveform inversion method, a reverse-time migration image is shown on the left side of FIG. 13, which shows a wavey structure. The vertical axis of FIG. 13 is the depth and the horizontal axis of FIG. 13 is a common midpoint location. As shown in FIG. 13, the conventional FWI model perturbations in the map in FIG. 13 cannot resolve the geological structure as indicated in the reverse-time migration image in FIG. 13.

Figure 14:
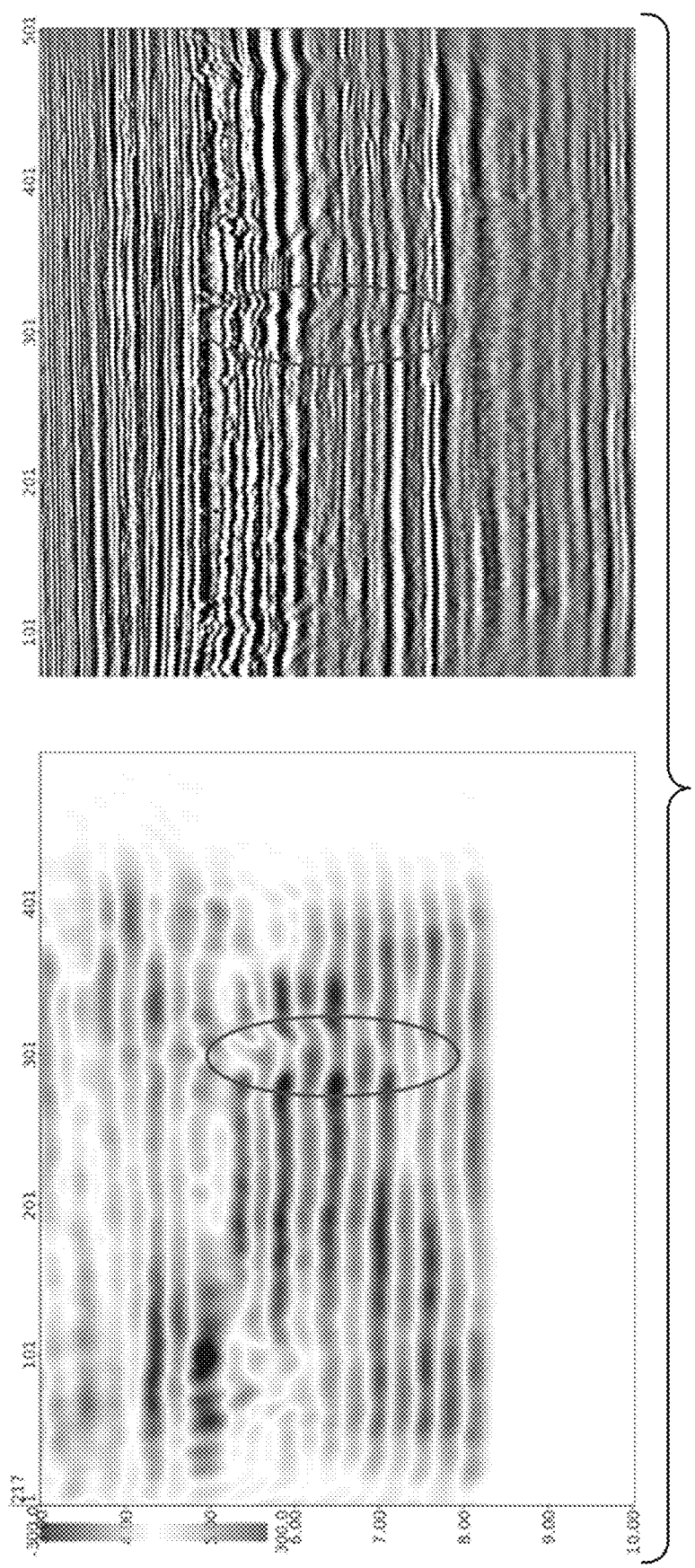
FIG. 14 is a map of updated velocity in a seismic full waveform inversion method according to an embodiment and a reverse-time migration image using the seismic full waveform inversion method independent of a source wavelet according to an embodiment.

FIG. 14 is a map of updated velocity in a seismic full waveform inversion method according to an embodiment and a reverse-time migration image using the seismic full waveform inversion method according to an embodiment on the same field data and with the same initial P-wave velocity model as FIG. 13. The vertical axis of FIG. 14 is the depth and the horizontal axis of FIG. 14 is a common midpoint location. As shown in FIG. 14, the FWI model perturbations from an embodiment in FIG. 5, which are shown in the map in FIG. 14, reveal geological structures in the velocity and provide a better reverse-time migration image with improved focus and continuity as shown in FIG. 14. In the reverse-time migration image in FIG. 14, the subsurface layers are much flatter, which is more consistent with the geologic interpretation in the survey region, than the reverse-time migration image in FIG. 13. Based on an updated velocity in a map of the seismic waveform inversion method according to an embodiment in FIG. 5, a reverse-time migration image is shown in FIG. 14, which shows substantially reduced waviness of the structure as compared with the reverse-time migration image in FIG. 13. Using a source wavelet, this comparison demonstrates that the updated velocity model according to embodiments is better than the velocity model of the conventional method.

While embodiments of this disclosure have been shown and described, modifications can be made by one skilled in the art without departing from the spirit or teaching of this invention. The embodiments described herein are exemplary only and are not limiting. Many variations and modifications of methods, systems and apparatuses are possible and are within the scope of the invention. Accordingly, the scope of protection is not limited to the embodiments described herein, but is only limited by the claims. The scope of the claims shall include all equivalents of the subject matter of the claims.

What is claimed is:

1. A method for performing a seismic full waveform inversion to generate a velocity model of subsurface formations of a survey region, the method comprising operations of:

(a) positioning a first plurality of seismic data recording sensors in the survey region at different locations and/or positioning a well logging tool having a second plurality of seismic data recording sensors in a well bore in the survey region;

(b) emitting energy at points of incidence in the survey region to generate seismic waves, which travel through subsurface earth formations;

(c) sensing the seismic waves and recording seismic data based on the seismic waves using the first plurality of seismic data recording sensors and/or the second plurality of seismic data recording sensors;

(d) transmitting the seismic data from the first plurality of seismic data recording sensors and/or the second plurality of seismic data recording sensors to a computer system including one or more memories and storing the seismic data in one or more memories;

(e) storing a source wavelet in the one or more memories;

(f) performing, by the computer system, a forward modeling operation using the source wavelet and a current velocity model;

(g) generating, by the computer system, an updated velocity model for the seismic full waveform inversion using the forward modeling operation;

(h) performing operations (f) and (g) until convergence;

(i) outputting the updated velocity as the final velocity model to a display upon convergence; and (j) displaying a high-resolution image of the final velocity model on the display of the computer system, wherein the forward modeling operation generates synthetic data and a forward wavefield, wherein the operation (g) further comprises matching the seismic data with the synthetic data and evaluating a misfit between the seismic data and the synthetic data using a misfit function, wherein the misfit function comprises:

$$\min_m C(m) = \sum_{s=1}^{N_s} \sum_{r=1}^{N_r} \int_0^T dt |d_{obs,s,r}(t) - M_s(t) * d_{syn,s,r}(m;t)|^2,$$

where * denotes a convolution operator, m is an earth model vector, t is time, and $M_s(t)$ is a matching filter by matching the synthetic data to the seismic data with a least squared Wiener filter $$M_s(t) = \text{Inverse Fourier Transform}\left[\frac{\sum_{r=1}^{N_r} d_{syn,s,r}^\dagger(\omega)d_{obs,s,r}(\omega)}{\sum_{r=1}^{N_r} d_{syn,s}^\dagger(\omega)d_{syn,s}(\omega) + \epsilon}\right],$$

where $d_{obs,s,r}(\omega)$ and $d_{syn,s,r}(\omega)$ are Fourier transform of the seismic data and synthetic data.

2. The method of claim 1, wherein the seismic full waveform inversion is one of an acoustic inversion and an elastic inversion, and wherein the subsurface formations of the survey region are isotropic or anisotropic.

3. The method of claim 1, wherein the one or more memories stores an initial velocity model.

4. The method of claim 1, wherein the operation (g) further comprises generating an adjoint source based on the misfit between the seismic data and the synthetic data.

5. The method of claim 4, wherein the adjoint source is generated according to the following equation:

$$f_{adj,s}(t) = \sum_{r=1}^{N_r} M_s(t) \otimes [d_{obs,s,r}(t) - M_s(t) * d_{syn,s,r}(m;t)],$$

where $\otimes$ denotes the cross-correlation operator.

6. The method of claim 4, wherein the operation (g) further comprises: determining an inversion gradient based on the adjoint source.

7. The method of claim 6, wherein the operation (g) further comprises: determining a step length and a step direction for updating the velocity model; and updating the velocity model.

8. The method of claim 1, wherein the source wavelet is an Ormsby wavelet or a Ricker wavelet.

9. A system for performing a seismic full waveform inversion to generate a velocity model of subsurface formations of a survey region, the system comprising:
a first plurality of seismic data recording sensors positioned in the survey region at different locations and/or a well logging tool having a second plurality of seismic data recording sensors positioned in a well bore in the survey region; and
a blasting device positioned at each point of incidence in the survey region to generate seismic waves, which travel through subsurface earth formations,
wherein the first plurality of seismic data recording sensors and/or the second plurality of seismic data recording sensors sense seismic waves and record seismic data based on the seismic waves and transmit the seismic data to a computer system including one or more memories and at least one processor,
the one or memories store the transmitted seismic data, a source wavelet, and instructions, and
the one or more processors execute the instructions stored in the one or more memories to implement operations of:
(f) performing a forward modeling operation using a source wavelet;
(g) generating an updated velocity model for the seismic full waveform inversion using the forward modeling operation;
(h) performing operations (f) and (g) until convergence;
(i) outputting the updated velocity model as the final velocity model to a display upon convergence; and
(j) displaying a high-resolution image of the final velocity model on the display of the computer system,
wherein the forward modeling operation generates synthetic data and a forward wavefield,
wherein the operation (g) further comprises matching the seismic data with the synthetic data and evaluating a misfit between the seismic data and the synthetic data using a misfit function, wherein the misfit function comprises $$\min_m C(m) = \sum_{s=1}^{N_s} \sum_{r=1}^{N_r} \int_0^T dt |d_{obs,s,r}(t) - M_s(t) * d_{syn,s,r}(m;t)|^2,$$

where * denotes a convolution operator, m is an earth model vector, t is time, and $M_s(t)$ is a matching filter by matching the synthetic data to the seismic data with a least squared Wiener filter $$M_s(t) = \text{Inverse Fourier Transform}\left[\frac{\sum_{r=1}^{N_r} d_{syn,s,r}^\dagger(\omega)d_{obs,s,r}(\omega)}{\sum_{r=1}^{N_r} d_{syn,s}^\dagger(\omega)d_{syn,s}(\omega) + \epsilon}\right],$$

where $d_{obs,s,r}(\omega)$ and $d_{syn,s,r}(\omega)$ are Fourier transform of the seismic data and synthetic data.

10. The system of claim 9, wherein the seismic full waveform inversion is one of an acoustic inversion and an elastic inversion, and wherein the subsurface formations of the survey region are isotropic or anisotropic.

11. The system of claim 9, wherein the one or more memories stores an initial velocity model.

12. The system of claim 9, wherein the operation (g) further comprises generating an adjoint source based on the misfit between the seismic data and the synthetic data.

13. The system of claim 12, wherein the adjoint source is generated according to the following equation:

$$f_{adj,s}(t) = \sum_{r=1}^{N_r} M_s(t) \otimes [d_{obs,s,r}(t) - M_s(t) * d_{syn,s,r}(m;t)],$$

where $\otimes$ denotes the cross-correlation operator.

14. The system of claim 12, wherein the operation (g) further comprises: determining an inversion gradient based on the adjoint source.

15. The system of claim 14, wherein the operation (g) further comprises: determining a step length and a step direction for updating the velocity model; and updating the velocity model.

16. The system of claim 9, wherein the source wavelet is an Ormsby wavelet or a Ricker wavelet.

\* \* \* \* \*